(12) United States Patent
Nagel et al.

(10) Patent No.: US 7,089,563 B2
(45) Date of Patent: Aug. 8, 2006

(54) METHODS AND APPARATUS FOR EXCHANGING INFORMATION BETWEEN BROWSER PAGES

(75) Inventors: Daniel A. Nagel, Ben Lomond, CA (US); Chad A. Reese, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 910 days.

(21) Appl. No.: 09/727,723

(22) Filed: Dec. 1, 2000

(65) Prior Publication Data

US 2002/0103902 A1 Aug. 1, 2002

(51) Int. Cl.
*G06F 3/00* (2006.01)
*G06F 9/44* (2006.01)
*G06F 9/46* (2006.01)
*G06F 13/00* (2006.01)

(52) U.S. Cl. ............. 719/313; 719/312; 709/225; 707/3; 707/4; 707/5

(58) Field of Classification Search ........... 719/312, 719/313; 709/225; 707/3–5
See application file for complete search history.

(56) References Cited

U.S. PATENT DOCUMENTS 5,835,712 A * 11/1998 DuFresne .......... 709/203
5,954,798 A * 9/1999 Shelton et al. ............ 709/224

* cited by examiner

*Primary Examiner*—Jason D Cardone
*Assistant Examiner*—Azizul Choudhury
(74) *Attorney, Agent, or Firm*—Chapin IP Law, LLC; Barry W. Chapin, Esq.

(57) ABSTRACT

The invention provides a system that allows logic entities that perform within different browser pages to exchange state information such as variable or data element values between each other. To do so, the system of the invention defines a data element having a value for use by a first application logic entity in a first browser page. The system then dynamically generates a browser page identifier for a second browser page which includes state information such as values for data elements defined in the first browser page. The system then invokes access to the second browser page within a browser using the browser page identifier that was dynamically generated. When the browser loads the second browser page, and logic entity in the second browser page of the invention retrieves the value of the data element from the browser page identifier used by the browser to retrieve the second browser page. State information transferred using a browser page identifier in this manner may include multiple values for multiple data elements. The application logic entities within each browser page can thus manipulate values of data elements in those values can be transferred to other application logic entities in other browser pages via the invention. In this manner, multiple application logic entities that exist in different browser pages can operate collectively as a single software application via the state exchange mechanisms of the invention.

33 Claims, 5 Drawing Sheets

STATE RETRIEVAL LOGIC ENTITY OPERATION

METHODS AND APPARATUS FOR EXCHANGING INFORMATION BETWEEN BROWSER PAGES

FIELD OF THE INVENTION

The present invention generally relates to mechanisms and techniques for exchanging information between pages such as browser pages in a browser, and more particularly, to systems and techniques which allow variables and state information to be captured and transmitted from one browser page to another.

BACKGROUND OF THE INVENTION

Computer networks such as the Internet provide a variety of different mechanisms that allow a person to perform communications and data processing tasks. One such mechanism is called the World Wide Web or simply "the web." Generally, the World Wide Web comprises a collection of inter-operating client and server software applications which use a suite of data communications protocols to communicate with each other. A typical conventional client software application is a web browser and operates on a client computer system such as a personal computer or workstation under control of a user. The user can operate the web browser to access web pages that conventional server software operating on a server computer system serves to the web browser over a computer network such as the Internet. In some circumstances, a web browser can access or load web pages, documents, files or other information other than those provided by server software. By way of example, a user of a computer can operate a web browser to access web pages or other documents stored locally within a file system (e.g., on a disk) in that user's computer, without the web browser having to interact with a web server in a remote location over a computer network.

A conventional web page may include information formatted in a markup language such as the hypertext markup language (HTML). The web browser can load and interpret an HTML formatted web page in order to display or present to the user any text, graphics, audio, video or other data contained within, or referenced by, the web page. A typical web page can include one or more hypertext links, also referred to simply as "links" or Uniform Resource Locators (URLs) which can reference information not specifically contained within the web page.

A link or URL within a web page can serve a variety of purposes. Generally, however, links operate as location identifiers to reference other data or information not specifically contained within the web page that contains the link. Some links are called embedded links that reference data (e.g., an audio file or a graphic image) that is to be loaded into the web browser in conjunction with the web page, when a web browser accesses the web page containing the embedded link. For instance, an HTML instruction within a web page may contain in embedded link to a graphic file. Many different web pages may each contain an embedded link to the same graphic file. When a web browser loads any one of such web pages, the web browser, during interpretation of the HTML instructions within the web page, detects the embedded link and proceeds to reference and load the graphic image contained in the graphic file referenced by that embedded link. In this manner, the embedded link serves as a location identifier for the graphic image and causes the graphic image data to be incorporated into the view of the web page that the web browser presents to the user.

Other links within a web page may provide navigation functionality for the user of the web browser. For instance, a link within a first web page may reference a second web page. Such a link may not be an embedded link in this sense that a web browser that interprets such a link within a web page may not immediately reference the data or other information (i.e., the second web page in this example) referred to by the link. Instead, the web browser can present, render or otherwise display the link to the user along with the rest of the web page contents. A typical web browser implementation can associate a link to a text phrase, graphic or icon associated with the link. A user of the web browser that invokes the link, for example, via a click of a mouse on the text, graphic or icon associated with the link, causes the web browser to navigate (i.e., to load and obtain) the data referenced by that link. In the instant example then, a user may select the underlined link referencing the second web page, which causes the browser to invoke access to the second web page for display to the user. In this manner, a link can be used to cause a web browser to navigate between web pages. Web browsers often provide other web page navigation features such as BACK and FORWARD buttons that cause the browser to load a next or a previous web page, based on a history of web page location identifiers (e.g., URLs) of web pages that a user has visited (i.e., that the browser has displayed for viewing by the user).

Modern web browser software applications also typically include an ability to process web pages that include logic or programming instructions that can perform complex tasks within the processing environment of a web page provided by the web browser. As an example, most web browser software applications come bundled with (i.e., include an interface to) a Java or JavaScript interpreter (also known as a Java virtual machine or JVM) that allows the web browser to process web pages that include JavaScript. JavaScript is a scripting language that provides functionality much like a programming language within the environment of a web page. For instance, a single web page can include JavaScript statements (i.e., JavaScript commands and/or logic instructions) that can perform complex calculations, data manipulations, graphics processing or other tasks. A web browser typically causes such script processing to occur with the web page containing the JavaScript is loaded into web browser for presentation to a user. Other conventional scripting languages exist as well which operate within the context of a web page loaded into a web browser. An example of another of such scripting languages for use in web pages is VBScript, produced by Microsoft Corporation of Redmond, Wash.

Typical examples of conventional web browser software applications are Netscape Navigator manufactured by Netscape Corporation, of Mountain View, Calif., and Internet Explorer manufactured by Microsoft Corporation.

SUMMARY OF THE INVENTION

The operation of conventional web browser software applications that operate with conventional web pages, that may include conventional script logic instructions such as JavaScript, suffer from a number of drawbacks. In particular, if a conventional web page includes JavaScript or another scripting/programming-type language in the form of a routine, function or set of instructions (e.g., JavaScript code), such script code has limited ability to interoperate with other script code, functions or routines that may exist within other web pages. This is primarily because a typical conventional web browser treats a single web page which is loaded into the web browser for viewing by the user as a self-contained environment with respect to any script code that may be contained and operated upon (e.g., interpreted) by the web browser within that web page.

Thus, when a browser loads one web page for viewing by a user, other web pages that the browser may have previously loaded or that will be loaded in the future are inaccessible (i.e., are not loaded into memory at all) with respect to the scripting code or logic within the page currently loaded into the browser. That is, script code existing in a web page cannot directly exchange data with other script code in other web pages that are not currently being viewed by the user of the browser.

Still further, conventional JavaScript or other such scripting languages were not developed with the intent of writing entire software applications in the scripting language in a web page. Rather, scripting languages such as JavaScript are intended to provide basic or limited processing functionality in a single web page environment within a browser for such tasks as manipulating graphic images, obtaining user supplied data, or other tasks related to the web page in which the scripting instructions are included. As such, conventional scripting instructions contained in a web page do not include an ability to maintain state information between a portion of script code in one web page and another portion of script code in another web page. Conventional web page scripting languages thus do not have direct access to computer system memory or registers in a processor of the computer system, nor do they contain the ability to create data structures such as stacks, heaps or other memory resident storage locations for use in storing data or scripting language state information as multiple web pages are loaded, viewed and then unloaded within a browser.

The present invention is based in part on these observations and provides mechanisms and techniques that significantly overcome such limitations. In particular, the system of the invention includes method embodiments to perform techniques of the invention. Once such method embodiments operates in a browser, and includes a method for transferring information between logic entities in browser pages. Logic entities are any type of processing logic or instructions can be executed, run, interpreted or otherwise performed within a web page environment with a browser in a computer system.

In particular, one method of the invention comprises the step of defining a data element having a value for use by a first application logic entity in a first browser page. The first application logic entity can be any type of performable instructions, routine, function, procedure or other type of processing that the browser can perform all displaying a browser page. In a preferred embodiment, application logic entities contained processing or script code (e.g., JavaScript) that carries out tasks related to software application which uses the invention to pass state information between application logic entities. The data element maybe, for example, a JavaScript variable and the value may be any data or information assigned as the contents of the variable by the step of defining. The method generates a browser page identifier for a second browser page. The browser page identifier maybe a URL or other page identification mechanism. The browser page identifier includes the value for the data element. In a preferred embodiment, the value for the data element (of which there may be more than one) is appended at the end of the browser page identifier is a character delineated string of figures. The method also includes the step of invoking access to a second browser page using the browser page identifier. The second browser page can include a second application logic entity. The method then retrieves the value of the data element from the browser page identifier for use by the second application logic entity. In this manner, the invention allows browser pages to exchange state information.

According to another method embodiment of the invention, the step of defining a data element includes the steps of declaring a data element for use by a first application logic entity and providing a value for the data element. In a related embodiment, the step of providing a value for the data element comprises the step of retrieving the value for the data element from a browser page identifier identifying the first browser page. Using these techniques, the method embodiments of the invention can define or declare data elements for use by logic entities with a browser page. In the related embodiment, values for data elements in the retrieved from a browser page identifier identifying the browser page in which the logic entities exist.

In another embodiment of the invention, the step of retrieving a value of the data element from a browser page identifier identifying the first browser page includes the steps of parsing the browser page identifier to retrieve a value for a data element from the browser page identifier and assigning the value to the data element that corresponds to the value parsed from the browser page identifier. Using this technique, the invention can retrieve values for data elements for a browser page identifier which may be, for example, a URL of the page in which the logic entities that implement the method of the invention operate. Also according to this method embodiment, the method repeats the steps of parsing and assigning for each value contained in the browser page identifier such that all data elements containing a value within the browser page identifier receive an assignment of their respective value parsed from the browser page identifier. As such, a browser page identifier to be created according to the invention to include values for many different data elements that can be passed between browser pages.

In yet another embodiment, the step of generating a browser page identifier includes the steps of extracting a value for each data element shared between the first application logic entity and the second application logic entity to create a value array. The value array maybe, for example, a character delineated string of data element values. The method embodiment also includes the steps of obtaining a page designator for the second browser page and appending the value array containing the values for each data element to the page designator for the second browser page to form the browser page identifier. Using this technique, this method embodiment can dynamically and automatically generate or create a browser page identifier such as a URL which identifies a page, for instance, which the user desires to navigate to and which also contains data element values for data elements used by logic entities within the page that the user is navigating from.

In a further embodiment, the browser page identifier is a uniform resource locator that is dynamically generated via the steps of extracting, obtaining and appending and that contains the value of the data element shared by the first application logic entity and the second application logic entity. Thus the uniform resource locator includes state information for application logic entities that in this embodiment comprises values of data elements used by those application logic entities.

Another embodiment of the invention includes the step of detecting a navigation command to navigate to the second browser page. Also in this embodiment, the steps of generating and invoking are performed in response to the step of detecting the navigation command to navigate to the second browser page, such that the browser page identifier produced in response to the step of detecting the navigation command includes a value for the data element that is created by the first application logic entity and is passed to the second application logic entity via the browser page identifier. Accordingly, the navigation command that a browser receives, for instance, from a user of the browser can trade the operation of the invention to pass state information from a current browser page that the user is viewing to a browser page to which the user attempts to navigate.

In yet another embodiment, the steps of generating and invoking are performed by a state sender logic entity that operates within the browser in a computer system and the step of retrieving is performed by a state retrieval logic entity that also operates in the browser. The state sender logic entity and state retrieval logic entity are logic entities incorporated into the first browser page and second browser page which interoperate to transfer values of data elements shared by the first application logic entity and the second application logic entity between the first browser page and the second browser page via incorporation of such values of data elements into browser page identifiers. An example of a state sender logic entity is the send_query_string JavaScript function or routine provided within the example implementation of the invention shown in APPENDIX A. An example of a state retrieval logic entity is the get_variables JavaScript function provided within the example implementation shown in APPENDIX A.

In another embodiment, the first application logic entity and the second application logic entity collectively form an application. Also in this embodiment, the values of data elements shared by the first application logic entity and the second application logic entity collectively form state information that the state sender logic entity and the state retrieval logic entity can pass between the first browser page and second browser page via browser page identifiers for use by the application. This allows the state sender logic entity and a state retrieval logic entity to interoperate with each other between browser pages to exchange state information for use, for example, by application logic entities also included within those browser pages.

Other embodiments of the invention include computer systems configured to perform all of the method embodiments summarized above and explained herein as the invention. In particular, such computer system embodiments include a processor, a memory system and an interconnection mechanism coupling the processor and the memory system. The memory system is encoded with an browser application that, when performed on the processor, forms a browser that operates to cause the computer system to performing all of the operations of the method embodiments and operations of the invention. That is, the invention includes computer systems configured to perform all of the method operations in embodiments disclosed herein.

Generally, embodiments of the invention can perform all of the methods disclosed herein via software control, or via hardware and/or software configured to perform those methods and the techniques.

Other embodiments of the invention that are disclosed herein include software programs to perform the methods and operations summarized above and disclosed in detail below. More particularly, a computer program product is disclosed which has a computer-readable medium including computer program logic encoded thereon to provide the methods for transferring information between logic entities in browser pages according to this invention. The computer program logic, when executed on at least one processor within a computing system, causes the processor to perform the operations (e.g., the method embodiments and operations summarized above, and described in detail later) indicated herein. This arrangement of the invention may be provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software, firmware or other such configurations can be installed onto a computer system to cause the computer system to perform the techniques explained herein as the invention.

It is to be understood that the system of the invention can be embodied strictly as a software program, as software and hardware, or as hardware alone. Is also to be understood that the event processing techniques and mechanisms of this invention typically perform (e.g., execute, run, or are otherwise operated) on computer systems coupled to a computer network, though this is not required for the invention. Is also to be understood computer systems configured according to the invention include a browser process such as a web browser and a preferred embodiment of the invention is implemented within a state retrieval logic entity which may be, for example, a JavaScript routine and within a state sender logic entity which may also be, for example, a JavaScript routine, each of which may be included for within browser pages that the web browser may load and process accordingly.

The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
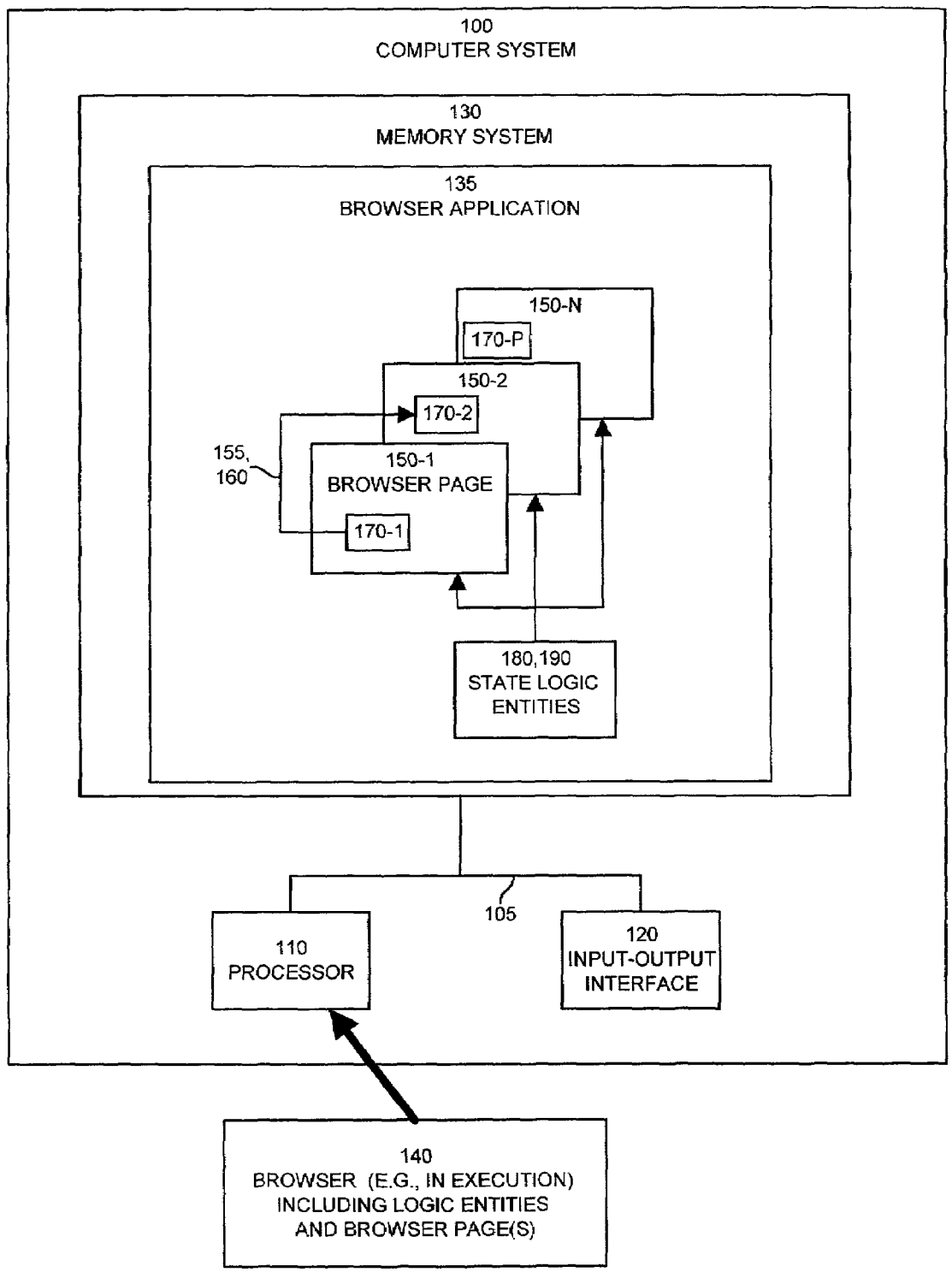
FIG. 1 illustrates a computing system environment that is suitable for use in describing example operations of embodiments of the invention.

The present invention provides techniques and mechanisms that enable the transfer of information between logic entities (e.g., groups of processing logic instructions) that operate within different browser pages. As an example, a web browser can load a first browser page (e.g., web page) containing one or more logic entities configured in accordance with invention. The logic entities may be, for example, JavaScript routines. One such JavaScript routine can exist within a first browser page and can define one or more data elements such as JavaScript variables. The JavaScript routine can retrieve values for the data elements from a browser page identifier associated with the first browser page. The browser page identifier may be, for example, a URL of the first browser page that includes state information appended to the end of the URL that contains the values for the data elements to be accessed by the JavaScript routine. The JavaScript routine can retrieve the values for the data elements, for example, by parsing the URL to extract the values for the data elements from the state information appended to the end of the URL.

Another logic entity (e.g., another JavaScript routine) configured in accordance with the invention and incorporated into a browser page can detect the invocation of browser processing to access another browser page. As an example, a JavaScript routine operating as such a logic entity can be activated when the user of the web browser selects (e.g., clicks on) a link to navigate to another browser page. In response to this, the JavaScript routine can dynamically and automatically generate a browser page identifier, such as a URL, for a second browser page (i.e., the browser page to which the user desires to navigate to next from the current page), from within the first browser page (i.e., by the JavaScript activated in response to the navigation commend in the page that the user is currently viewing). As such, the browser page identifier (e.g., a URL) is dynamically and automatically generated.

During the generation of the browser page identifier, the JavaScript routine of the invention performing this process can extract a value for each data element that is required to be passed to another logic entity that will operate within the second browser page. The JavaScript routine can then append the values for the data elements (e.g., as a string in which each value is delineated with a predetermined character such as "&") onto a page designator for the second browser page, in order to dynamically create the URL for the second browser page that contains the values of data elements from the first browser page. The JavaScript routine can then invoke access to the second browser page using the browser page identifier which was just dynamically created.

In this manner, a URL created according to the invention can contain values for data elements from the first browser page which are passed to an awaiting logic entity within the second browser page for extraction from the URL of the second browser page. In this manner, logic entities such as JavaScript routines contained within different browser pages can pass state information such as values for data elements using browser page identifier's which caused navigation of the browser from one browser page to another.

FIG. 1 illustrates a computer system 100 configured in accordance with an example embodiment of the invention. The computer system 100 includes an interconnection mechanism 105 which couples a processor 110, an input-output interface 120, and a memory system 130. The memory system 140 is encoded with logic instructions (e.g., software code) that form a browser application 135 which can access a plurality of browser pages 150-1 through 150-N (collectively browser pages 150). The browser pages 150 may be HTML encoded web pages, for example. Accessible to the browser application 135 in the memory system 130 are state logic entities 180 configured in accordance with the invention. In one embodiment, the state logic entities 180, which will be explained in more detail shortly, are script routines comprised of JavaScript. The processor 110 can execute, run, interpret, or otherwise perform the logic instructions of the browser application 135 and any associated browser pages 150 and/or state logic entities 180 to form the browser 140. In other words, the browser 140 represents the execution or other operation of logic instructions that form the browser application 135, browser pages 150, and state logic entities 180 on or within the processor 110 in the computer system 100.

Each browser page 150 may include one or more application logic entities 170-1 through 170-P which can collectively operate between browser pages 150, using the invention, to form a complete software application as will be explained. The application logic entities 170 may be, for example, JavaScript or VBScript routines, Java applets or other operations or functions embedded within the browser pages 150 to perform any required functionality as intended by a developer (e.g., a person) who designs and develops the collection of browser pages 150. As an example, the application logic entities 170 may perform graphics and/or data processing that produces state information 155 such as values for data elements (e.g., JavaScript variables, not specifically shown) within their respective browser pages 150.

The computer system 100 illustrated in FIG. 1 is suitable for use in explaining example operations of the system of the invention. Generally, the state logic entities 180 provide the required functionality of the invention that allows a browser page 150 such as browser page 150-1 to operate (e.g., to execute, run, interpret or otherwise perform) the application logic entity 170-1 within the browser 140 to produce state information 155 including data elements (not specifically shown) such as variables that can have associated values. When an application logic entity such as 170-1 has completed its processing of the state information 155 (i.e., has used, accessed, or otherwise processed or manipulated data elements that comprised the state information 155), the browser page 150 (150-1 in this particular example) can access and operate the state logic entities 180 configured in accordance with the invention to pass the state information 155 between the browser page 150 (between browser page 150-1 and 150-2 in the illustrated example) via the use of a browser page identifier 160 (only one example of this operation shown in FIG. 1). As will be explained further, a browser page identifier 160 may be, for example, a URL of a browser page 150 that, in this invention, includes state information 155 contained within the URL.

Figure 2:
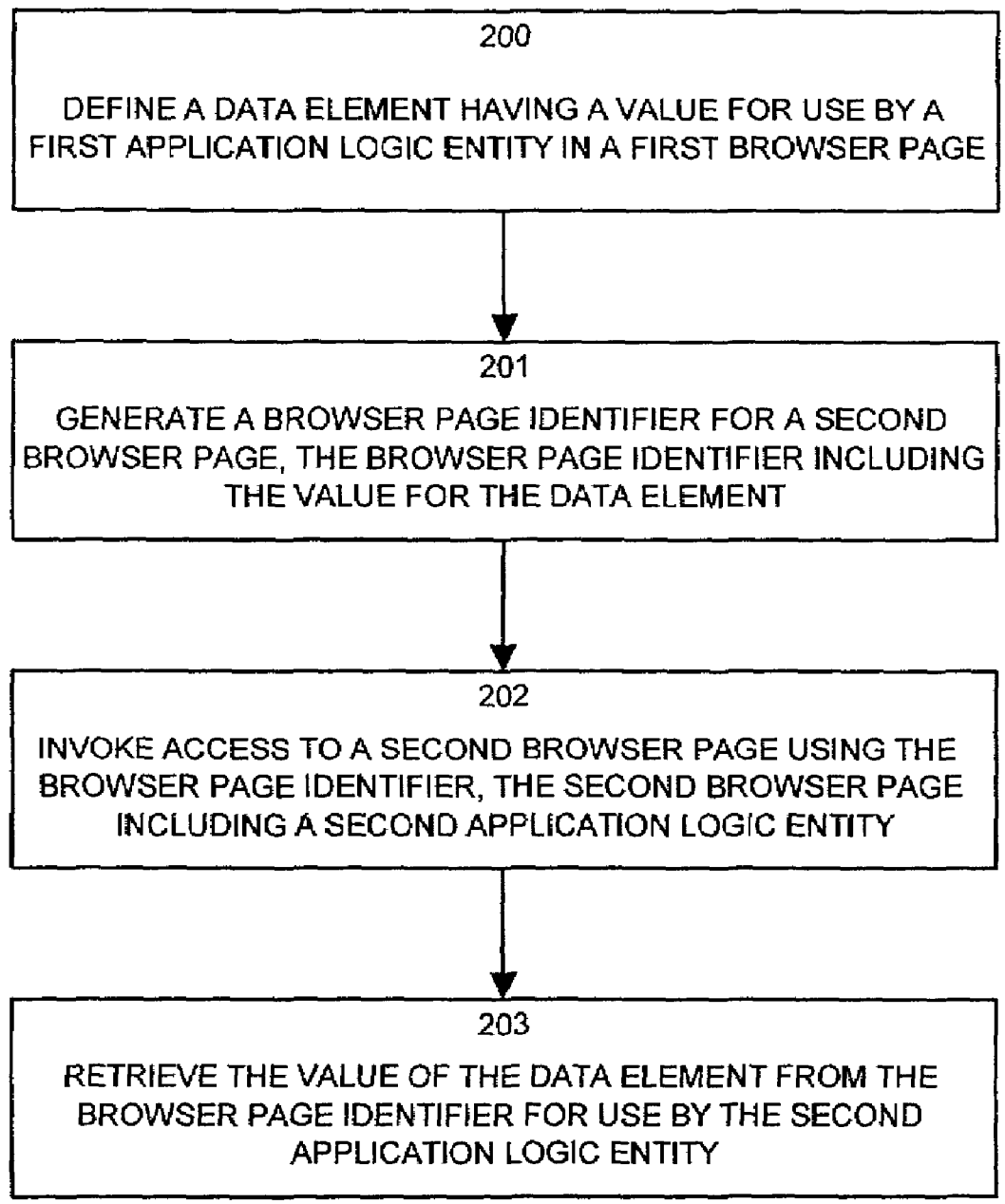
FIG. 2 shows a flow chart of processing steps performed by a browser operating according to embodiments of the invention.

FIG. 2 illustrates a flow chart of processing steps as performed by the browser 140 including (i.e., operating in conjunction with) one or more associated browser pages 150 and state logic entities 180 configured in accordance with embodiments of the invention.

In step 200, the browser 140 defines a data element having a value for use by a first application logic entity in a first browser page. By way of example, in step 200, the browser 140 may access (i.e., may invoke the processing of) a state logic entity 180 such as a JavaScript routine which defines (e.g., declares) one or more JavaScript variables including associated values to serve as data elements for use by the application logic entity 170-1 within the browser page 150-1.

Next, in step 201, the browser 140 generates, via the processing of a state logic entity 180 in this embodiment, a browser page identifier 160 for a second browser page such as browser page 150-2. The browser page identifier 160 includes the value for the data element as defined in step 200. As noted above, in a preferred embodiment, the browser page identifier 160 generated by the invention in step 201 is a URL of a browser page 150 (e.g., for browser page 150-2, which may be a web page in the example in FIG. 1) which includes any values for data elements defined within the state information 155 as used by an application logic entity 170 (e.g., 170-1 in the example in FIG. 1). The state logic entity 180 performing step 201 within the browser 140 may append the values of data elements to the end of the browser page identifier 160, for example, as a character delineated string of values. Thus, after processing step 201, the browser page identifier 160 identifies another browser page 150 (i.e., preferably other than the current page 150-1) and also includes a data element value (one or more, only one mentioned here) for a data element(s) from the current page. As will be explained, such data element values can be accessed or extracted from the browser page identifier 160 for use by logic entities 170 in the other browser page (e.g, for use by logic entity 170-2 in page 150-2) via this invention.

In step 202, the system of the invention operating within the browser 140 invokes access to a second browser page (150-2 in the instant example) using the browser page identifier 160 that was generated in step 201. The second browser page (e.g., 150-2) includes a second application logic entity 170 (specifically, 170-2 in the illustrated example). In other words, in step 202, the browser 140, via use, in this embodiment, of a state logic entity 180 configured according to the invention, obtains and loads the second browser page based on the URL created in step 201.

In step 203, the browser 140 equipped with the system of the invention, which now contains (i.e., has loaded and is in the process of rendering) the second browser page 150 (specifically, 150-2 in this example), uses a state logic entity 180 of the invention to retrieve the value of the data element from the browser page identifier 160 for use by the second application logic entity 170 (specifically, 170-2 in this example). In a specific embodiment as will be explained shortly, in step 203, the browser 140 loads the second browser page 150 (e.g., 150-2) referenced by the browser page identifier 160. The second browser page 150 (e.g., 150-2 in FIG. 1) includes a call to a state logic entity 180 that parses the browser page identifier 160 (e.g., parses the URL) of the second browser page 150 in order to extract a value for each data element within the state information 155, as required for use by any application logic entities 170 that exist within the second browser page 150. In other words, in step 203, once the browser 140 has obtained and loaded the second browser page 150-2 for viewing by a user, the state logic entity 180 of the invention accesses the URL used to obtain that page to extract any required data element (i.e., variable) values which were appended to the end of the URL, for example as a character delineated string, during the generation of that URL in step 201 within the first browser page 150-1.

In this manner, the system of the invention allows browser pages 150 to incorporate functionality provided by the state logic entities 180 of the system of the invention to gather, collect or otherwise bundle state information including data element values used by application logic entities (e.g., JavaScript) in one browser page and include or append such collected or bundled state information onto a dynamically generated URL for another browser page. The state logic entities 180 can then invoke the URL generated in this manner in order to cause the browser 140 to load the other browser page. The other browser page can then use the state logic entities 180 of the system of the invention to obtain the URL and to extract or parse the values from the URL, as appended to the URL by the operation of the state logic entities in the first browser page.

Figure 3:
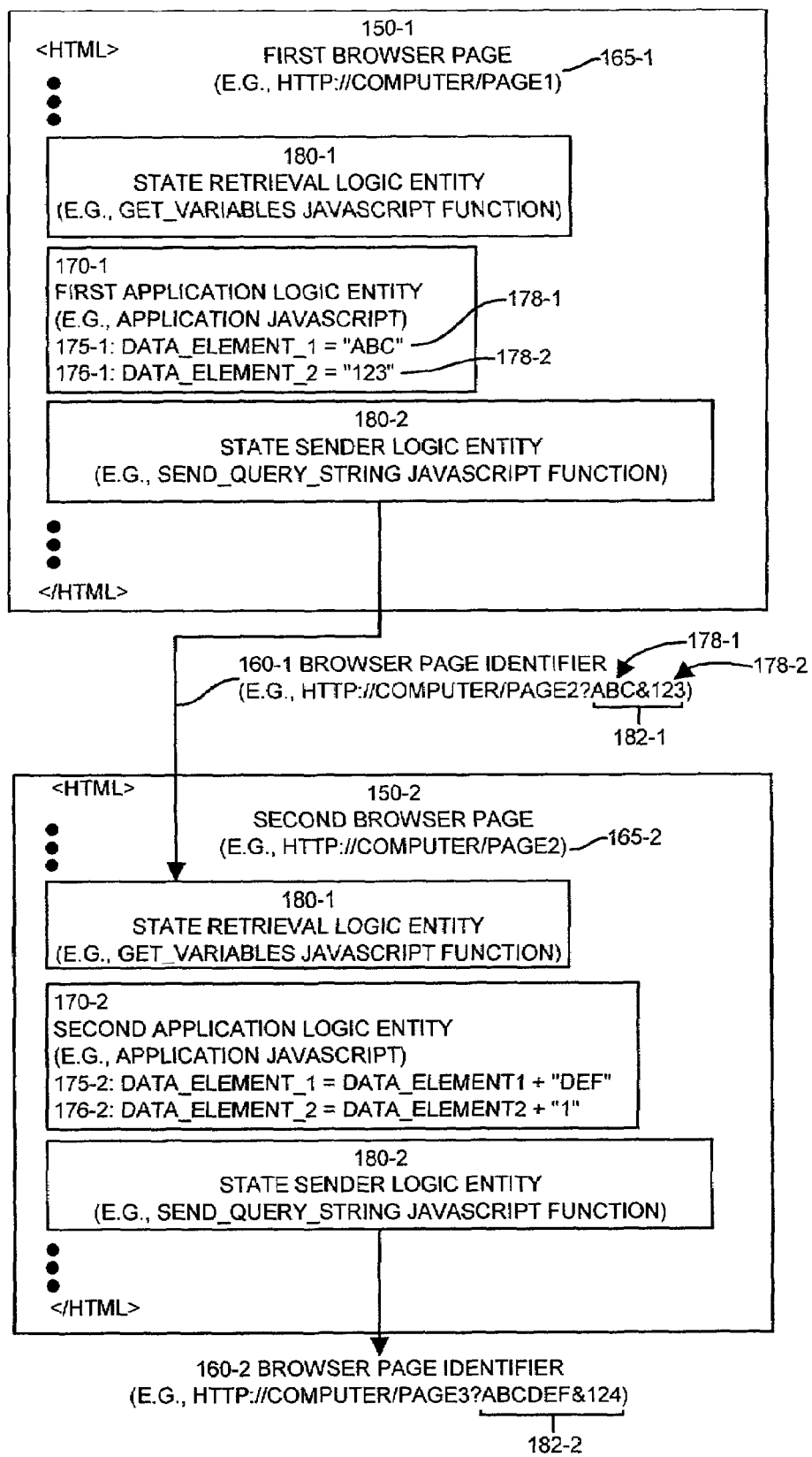
FIG. 3 illustrates details of first and second browser pages which incorporate and use the system of the invention in a browser.

FIG. 3 illustrates an example embodiment and functionality of the invention in more detail. In this example, the contents of two browser pages 150-1 and 150-2 are illustrated to show how the invention operates within the context of different browser pages to pass state information from one browser page to another for use by logic entities with those browser pages.

Each browser page 150-1 and 150-2 includes a page designator 165 shown in parentheses at the top of each browser page. For example, the page designator 165-1 for the first browser page 150-1 is "HTTP://COMPUTER/PAGE1." The page designator 165 for a browser page 150 identifies the location of the browser page (i.e., what server, network location, disk drive, file system location ,etc. where the page resides in storage), which in this example, is within the computer system 100. As will be explained, the system of the invention uses a page designator 165 for a browser page 150 to create a browser page identifier 160 configured in accordance with the invention.

The first browser page 150-1 includes a first application logic entity 170-1, as well as a state retrieval logic entity 180-1 and a state sender logic entity 180-2 (collectively state logic entities 180). The second browser page 150-2 includes a second application logic entity 170-2, as well as the state retrieval logic entity 180-1 and the state sender logic entity 180-2. In a preferred embodiment of the invention, the state retrieval logic entity 180-1 and the state sender logic entity 180-2 are script routines such as JavaScript functions which provide the functionality of the invention as needed to the first and second browser pages 150-1, 150-2. Each browser page 150-1 and 150-2 may, for example, obtain access to the state retrieval logic entity 180-1 and the state sender logic entity 180-2 via incorporating a function call to each logic entity 180. In one embodiment, while not specifically shown, each browser page 150 can contain an "include" statement which includes a file or library containing the logic instructions of each state logic entity 180-1, 180-2. By way of an example in which the state logic entities 180-1 and 180-2 are comprised of JavaScript, each browser page 150-1 and 150-2 may contain an HTML statement (not specifically shown in the example in FIG. 3) such as:

```
<script language = "JavaScript" src = "ics7750.js">
``` where a file having a filename "ics7750js" is a JavaScript file accessible by the browser 140 within the computer system 100. The file "ics7750js" contains the definitions (i.e., contains the JavaScript code, statements, function definitions, logic instructions, etc.) for the state retrieval logic entity 180-1 and the state sender logic entity 180-2. For more details on such an example embodiment of the invention, the reader is referred to APPENDIX A below which includes JavaScript code from the file ics7750.js and also includes two example web pages (HTML pages) which include the file ics 7750.js via the above command and which include calls to functions in a Javascript code file. APPENDIX A is an example only and embodiments of the invention are not limited as such.

The first and second application logic entities 170-1, 170-2 include any required functionality and utilize any required data element which are up to the discretion of the developer of each browser page 150. In the example illustrated in FIG. 3, the application logic entities 170 utilize data elements 175 and 176. For example, within the first application logic entity 170-1, the data element 175-1 "DATA_ELEMENT1" happens to be a string data element that is assigned a value "ABC," referenced in the figure as 178-1. The data element 176-1 "DATA_ELEMENT2" happens to be a numerical data element that is assigned a value "123," referenced as 178-2.

In a preferred embodiment of the invention, the application logic entities 170 collectively interoperate to exchange the values 178 of data elements (e.g., the values assigned to data elements 175, 176) as state information 155 (such an exchange provided by the system of the invention) to provide a complete software application that operates over a series or collection of multiple browser pages 150. In other words, using the system of the invention to exchange state information 155 (e.g., data element values 178) between different browser pages 150, the browser pages 150 can include or provide application logic entities 170 which can collectively interoperate to create or form an entire software application.

Figure 4:
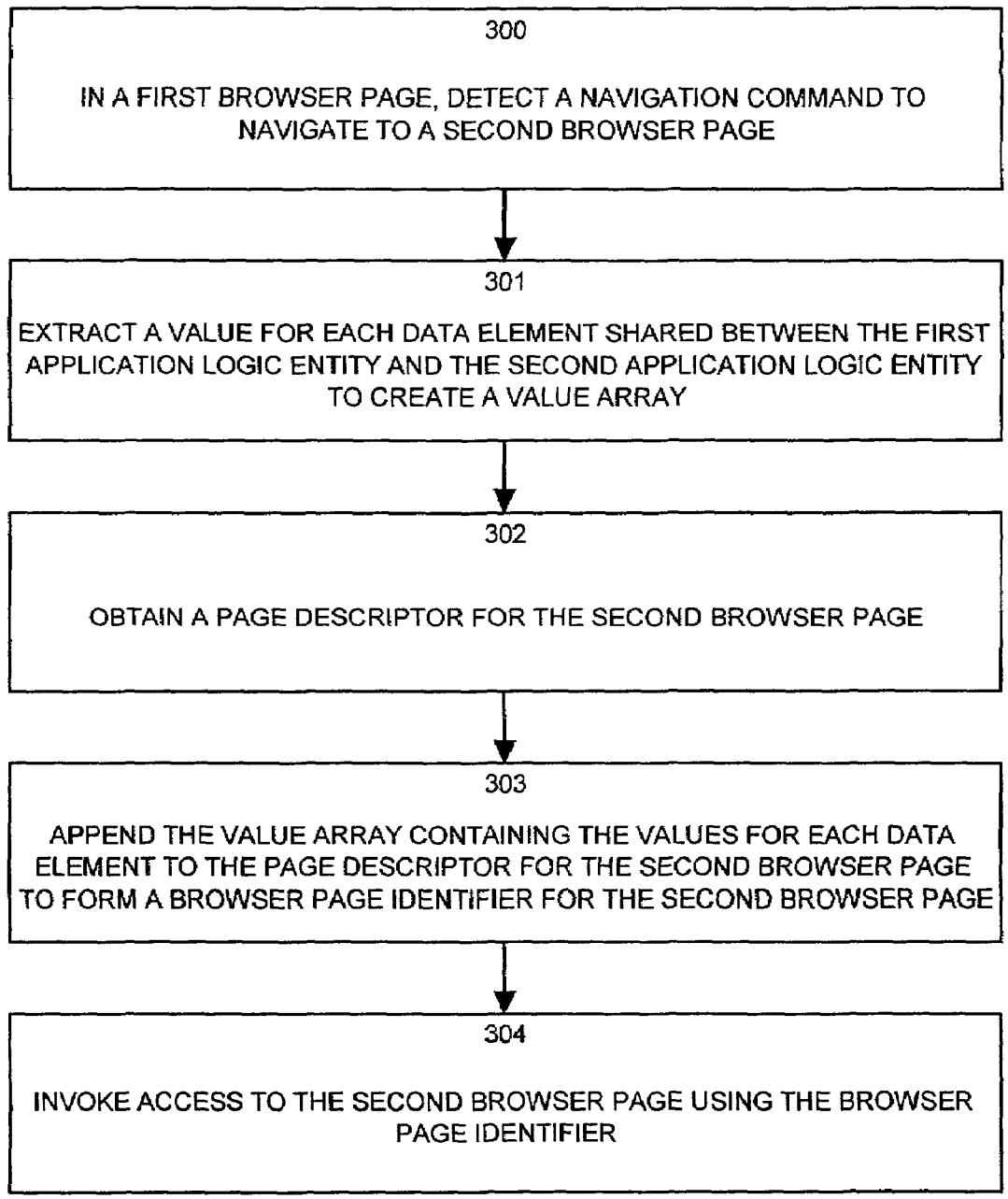
FIG. 4 is a flow chart of processing steps as performed by a state sender logic entity configured to operate according to embodiments of the invention within a browser.
Figure 5:
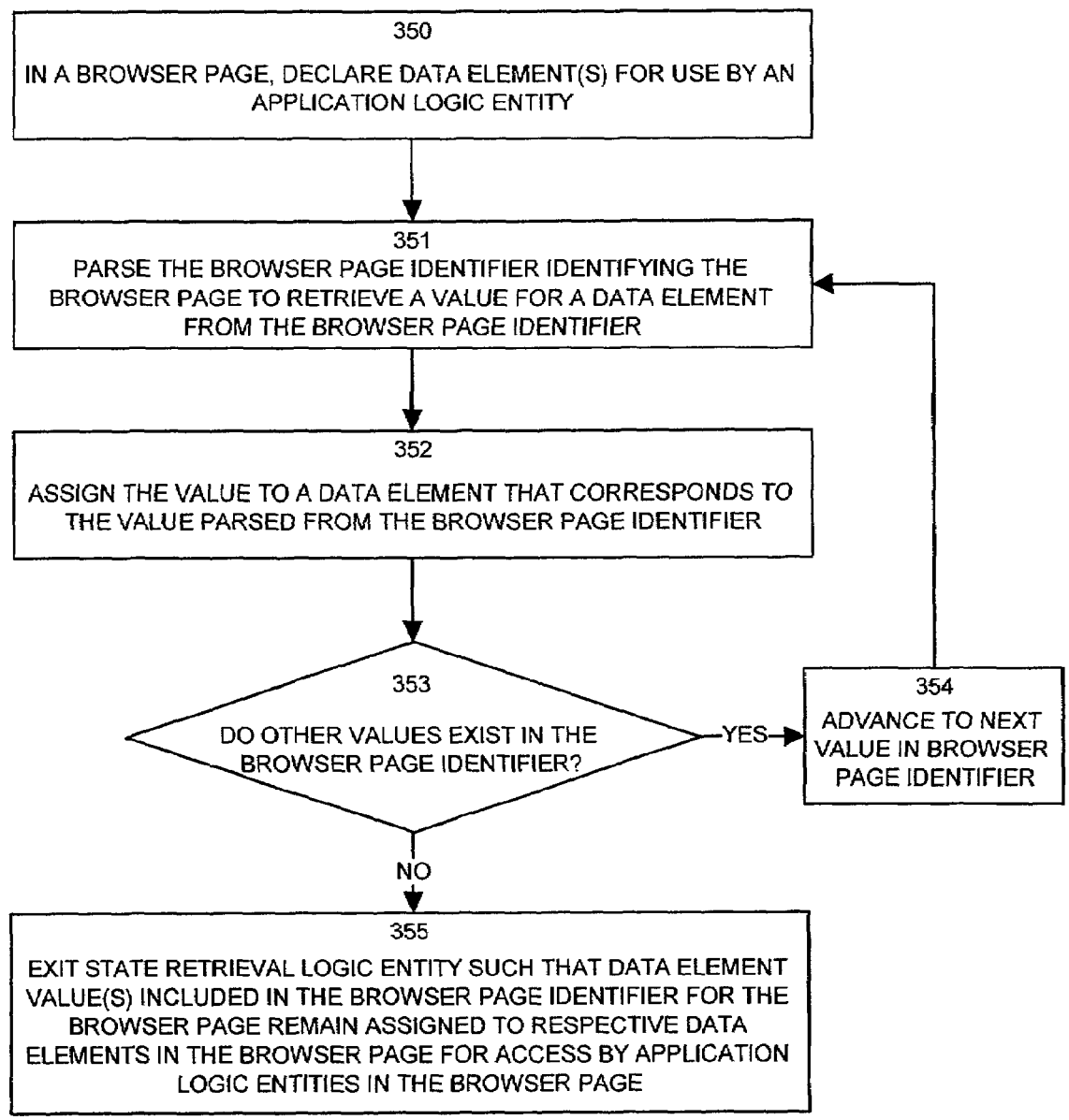
FIG. 5 is a flow chart of processing steps as performed by a state retrieval logic entity configured to operate according to embodiments of the invention within a browser.

An example operation of the system of the invention will now be provided with respect to FIG. 3 and the flow charts of processing steps shown in FIGS. 4 and 5. The flow chart of processing steps shown in FIG. 4 shows details of processing operations performed by the state sender logic entity 180-2, while the flow chart of processing steps shown in FIG. 5 shows details of processing operations performed by the state sender logic entity 180-1.

Assume for purposes of this example that the browser 140 (FIG. 1) has already loaded the first browser page 150-1. The first browser page 150-1 may be the start of an application for by logic entities distributed in multiple browser pages 150-1 through 150-N. While the first browser page 150-1 is being viewed by a user controlling the browser 140, the first application logic entity 170-1, which in this example comprises one or more VBSCcript, JavaScript or other script routines, functions, instructions or the like, processes the data elements 175 and 176 in some manner, such as assigning their respective values 178 ("ABC" and "123") as shown in FIG. 3 and as explained above. Note that only two data elements are shown in this example. There may be any number of such data element variables declared for use in a browser page. At some point during the viewing by the user of the browser page 150-1 in the browser 140, a navigation command (not specifically shown in the figures) is generated in some manner. Perhaps the user selects a link displayed within the browser page 150-1 in order to navigate to the second browser page 150-2.

In a preferred embodiment of the invention, a navigation command or other mechanism that causes a browser 140 to load or otherwise access another browser page 150 triggers the operation of the state sender logic entity processing shown in FIG. 4. Alternatively, an application logic entity 170 itself can complete any required processing of data elements and then can invoke the features of the invention explained here to transfer those data element values to the next browser page.

In any event, in step 300 in FIG. 4, operating within a first browser page 150-1, the state sender logic entity 180-2 detects a navigation command (i.e., an intent by either the user or an application logic entity 170) to navigate to a second browser page 150-2.

Next, in step 301, the state sender logic entity 180-2, performing within the browser 140, extracts a value 178 for each data element 175, 176, and so forth shared between the first application logic entity 170-1 and the second application logic entity 172 (contained within the second browser page 150-2, which is not yet loaded into the browser 140) to create a value array 182. A value array 182 in this embodiment is a character delineated array of data element values. Note that there may be a predetermined number of data elements, in which case the state sender logic entity 180-2 may know exactly how many data element values 178 must be appended or placed into the value array, or alternatively, the number of values of data elements that are to be placed into the browser page identifier (being created by this invention) may be dynamically determined, for example, by user input, or by inspecting each data element in a set of data elements to determine how many of the data elements may have values, or via another technique.

For example, as illustrated in FIG. 3, the value array 182-1 that the state sender logic entity 180-2 created in step 301 contains the values 178-1 and 178-2 of the data elements 175 and 176, and appears as follows:

ABC&123

In this example, the value array 182-1 represents all of the state information 155 (i.e., contains each of the data element values 178-1, 178-2 in this example) that are to be passed or transferred from the first browser page 150-1 to the second browser page 150-2 using the techniques of the invention as explained herein. Once the state sender logic entity 180-2 has placed all data element values 178 into a value array 182, processing can proceed to generate a browser page identifier 160 containing the state information 155 (i.e., the value array 182 in this case).

In step 302, the state sender logic entity 180-2 obtains a page descriptor 165-2 for the second browser page 150-2. In this example, the page descriptor 165-2 contains the value:

HTTP://COMPUTER/PAGE2.

Next, in step 303, the state sender logic entity 180-2 attends the value array 182-1 containing the values 178 for each data element 175, 176 to the page descriptor 165-2 of the second browser page 150-2 to form a browser page identifier 160-1 for the second browser page 150-2. In other words, in step 303, the state sender logic entity 182 in this example embodiment dynamically creates a URL that references the second browser page 152 and that contains the state information 155 in the form of the value array 182-1 containing the values for data elements 175, 176 that are shared between the application logic entities 170-1 and 170-2. Once the browser page identifier 160-1 for the second browser page 150-1 is constructed in this manner, processing proceeds to step 304.

In step 304, the state sender logic entity 180-2 invokes access to the second browser page 150-2 using the browser page identifier 160-1. In other words, in step 304, the sender state logic entity 180-2 within the first browser page 150-1 causes the browser 140 to retrieve and begin rendering the second browser page 150-2. Invoking the browser page identifier 161 a be performed, for example, by performing an HTTP GET operation to cause the browser 140 to retrieve the browser page 150-2.

In this manner, the state sender logic entity 180-2 captures independence state information 155 to and automatically and dynamically generated browser page identifier 160 in order to transfer the state information to another browser page 150.

Returning attention now to the illustration in FIG. 3, in response to the processing just explained with respect to FIG. 4, the browser 140 proceeds to retrieve, load and render the second browser page 150-2. Upon doing so, while rendering (i.e., during the loading and displaying of) the second browser page 150-2, the browser 140 encounters the state retrieval logic entity 180-1 configured in accordance with embodiment of the invention, at or near the top of the second browser page 150. At this point in processing, the browser 140 invokes the functionality of the state retrieval logic entity 180-1 within the second browser page 150-2.

FIG. 5 illustrates the processing steps of the state retrieval logic entity 180-1 configured in accordance with embodiment of the invention. Generally, the state retrieval logic entity 180-1 is responsible for retrieving any data element values from a browser page identifier 160 which was used to retrieve (i.e., to obtain and load) the browser page 150 in which state retrieval logic entity 181 exists.

To perform such functionality, in step 350, the state retrieval logic entity 180-1 operates in a browser page (e.g., in the second browser page 150-2 in this example) to declare data elements 175,176 for use by one or more application logic entities that may exist within the browser page 150. In this example, step 350, the state retrieval logic entity 181 in the second browser page 150-2 declares (e.g., instantiates or otherwise defines) the data elements 175 and 176.

Next, in step 351, the state retrieval logic entity 180-1 parses the browser page identifier 161 identifying the browser page (i.e., used to invoke the current browser page 150-2) to retrieve a value 178 for a data element 175 (or 176) from the browser page identifier 160-1. In the example illustrated in FIG. 3, in step 351, the state retrieval logic entity 180-1 parses the value array 182-1 to obtain, for example, the value 178-1 "ABC" that corresponds to the data element 175-2 "DATA_ELEMENT_1."

Next, in step 352, the state retrieval logic entity 181, while operating within the browser 140, assigns the value 178 (178-1 "ABC" in this example) to a data element 175-2 (in this example) that corresponds to the value 178-1 parsed from the browser page identifier 160-1 (in step 351). In this manner, the system of the invention transfers the data element value 178-1 having a value of "ABC" from the data element 175-1 has used within the first application logic entity 170-1 in the first browser page 150-1 to the data element 175-2 "DATA_ELEMENT_1" (e.g., the JavaScript variable name for the data element 175-2) as will be used by the second application logic entity 170-2 within the second browser page 150-2.

Next, in step 353, the state retrieval logic entity determines if other values exist within the browser page identifier that not yet been assigned to a corresponding data element. In this example, the data element value 178-2 "123" still remains to be parsed from the browser page identifier 160-1. Accordingly, another value 178 does exist in the browser page identifier 160 in processing proceeds to step 354.

In step 354, the state retrieval logic entity 181 advances to the next value 178-2 in the browser page identifier 160-1 (e.g., moves a pointer to the next value 178-2 in the value array 182-1), after which processing proceeds back to step 351 in order to parsed the browser page identifier 161 to obtain the next value 178-2 for assignment (second iteration of step 352) that values corresponding data element 176-2.

In step 353, if the state retrieval logic entity 180-1 determines that no further values 178 exist within the browser page identifier 160-1, processing proceeds to step 355 it which point the state retrieval logic entity 180-1 completes its function according the system of the invention such that data element values 178-1, 178-2 included in the browser page identifier 160-1 for the browser page 150-2 remain assigned to respective data elements 175-2, 176-2 for access by the second application logic entity 170-2 within the second browser page 150-2. In other words, once the state retrieval logic entity 180-1 extracts and assigns the values 178-1, 178-2 to the data elements 175-2, 176-2 from the browser page identifier 160-1, those data elements 175-2, 176-2 are now accessible (i.e., useable) by an logic entities 170-2, 180-1 and 180-2 within the second browser page 150-2.

As thus explained, the system of the invention is able to pass state information 155 such as variable values 178 between logic entities such as JavaScript code within different browser pages 150, without requiring a data structure such as a stack, a heap or permanently allocated memory locations to store such state information 155.

The invention thus allows, for instance as illustrated in the operation of the second application logic entity 170-2 in FIG. 3, the application logic entity 170-2 to further modify the initial or original values (i.e., the values obtained form browser page 150-1, as explained above) of the data elements 175-2 and 176-2. In the illustrated example, the second application logic entity 170-2 modifies the initial values "ABC" and "123" of the data elements 175-2 "DATA_ELEMENT_1" and 176-2 "DATA_ELEMENT_2" via the script statements:

DATA_ELEMENT_1=DATA_ELEMENT_1+
        "DEF"

DATA_ELEMENT_2=DATA_ELEMENT_2+1.

As such, the resulting values of the data elements 175-2 "DATA_ELEMENT_1" and 176-2 "DATA_ELEMENT_2" are "ABCDEF" and "124" (a numerical value), respectively. When the second application logic entity 170-2 completes processing, and the browser 140 again begins processing the state sender logic entity 180-2 (e.g., in response to a navigation command or some other event that requires the browser to load a new page), the state sender logic entity 182 performs as explained above with respect to FIG. 4 to produce a browser page identifier 160-2 as illustrated at the bottom of FIG. 3. That is, the browser page identifier 160-2 will be as follows:

"HTTP://COMPUTER/PAGE3?ABCDEF&124."

As illustrated by this example, the values for the data elements 175-2 and 176-2 are thus included in the browser page identifier 160-2, at which point the invention then causes the browser 140 to obtain, load and render another browser page (PAGE3, not specifically shown in this example) which can use the invention to obtain these data element values, as previously explained. This process can repeat from browser page to browser page so that values or other information is passed between such pages (as opposed to being passed first to another executable program such as a server) as needed.

Is to be understood by those skilled in the art that the system of the invention thus provides a mechanism to allow browser pages such as web browser page to include logic entities such as JavaScript, VBScript, any advanced or future form of HTML that might include the capability to include logic instructions, or the like that can send and receive state information 155 to other logic entities in other browser pages. Using this technique then, logic entities in different browser pages can interoperate with each other when web pages are loaded in response to navigation commands or other events in order to form a cohesive software application (i.e., a software application form from a plurality of logic entities interspersed or contained within different browser pages).

Those skilled in the art will understand that there can be many variations made to the operations, techniques and mechanisms explained above while still achieving the same objectives of the invention. Such variations are intended to be covered by the scope of this invention.

As an example, is to be understood by those skilled in the art that state information 155 is not limited to values of data elements used, for example, by script routines embedded within browser pages. Rather, in the context of this invention, state information 155 is intended to include any information, content or data accessible or contained within a browser page which may be captured in intended in any form to a browser page identifier. It is also to be understood that a browser page identifier is not limited to uniform resource locator. Instead, any mechanism for causing a browser to transfer operation to a first browser page in a second browser page may be suitable for use by the invention to include state information 155 in order to transfer the state information 155 from the first browser page to the second browser page. Likewise, it is to be understood that the system of the invention is not limited to implementation in any particular scripting language, browser page development language or environment, or to any particular type of browser. Rather, the invention is meant to the general in nature inapplicable to systems which have poor mechanisms for exchanging information between browser pages.

As another example of such a variation of the aforementioned example descriptions, it is to be understood that the processing steps of the aforementioned flowcharts may be rearranged will still accomplishing the objectives of the present invention. Those skilled in the art of computer programming will readily understand that there might be many ways to implement a software system that accomplishes the goals of the invention as claimed. As such, the foregoing description of embodiments of the invention are not intended to be limiting. Rather, any limitations to embodiments of the invention are presented in the claims following APPENDIX A.

An example implementation of portions of HTML and JavaScript code comprising an embodiment of the system of the invention are included in APPENDIX A below. Is to be understood this embodiment (i.e., the portions of an implementation shown in APPENDIX A) is not meant to be limiting of the invention but rather, illustrative of an example use of the techniques to the invention to pass state information from one browser page to another.

The portions of an implementation of the invention shown in APPENDIX A relate to a web page-based system that allows a user to move from page to page to configure a product (the 7750 system, in this example) manufactured by Cisco Systems of San Jose, Calif., with various features which result in the user being provided with, by the application of the invention within the web pages of this example implementation, a total price of the product as selected for configuration by the user. While APPENDIX A below only shows certain portions of the code and web pages involved in the entire implementation of this system, the entire contents of the code, HTML pages, images, JavaScript, and other logic or data files that comprise the program entitled "Cisco ICS-7750 Configuration Tool" are hereby incorporated by reference in their entirety.

APPENDIX A

Notes:

The "GetVariables" JavaScript function shown in this APPENDIX below corresponds to an example implementation of the state retrieval logic entity 180-1 discussed above.

The "sendQueryString" JavaScript function shown in this APPENDIX below corresponds to an example implementation of the state sender logic entity 180-2 discussed above.

The HTML Web Pages labeled "step2.html" and "step3.html" are examples of browser pages 150 (e.g., 150-1 and 150-2, respectively, in Figure 3) configured in accordance with the invention.

"ICS7750.JS":

```
<!--// Engage Cloaking Device
        var urlString = self.location.href;
        var queryString = urlString.substring(urlString.indexOf('?')+1,
urlString.length)
        var offset,start var
sw,es,rspe,slot,mrp1,mrp2,mrp3,mrp4,mrp5,mrp1a,mrp1b,mrp2a,mrp2b,mrp3a,m
rp3b
        var
mrp4a,mrp4b,mrp5a,mrp5b,dsp1a,dsp1b,dsp2a,dsp2b,dsp3a,dsp3b,dsp4a,dsp4b
        var
dsp5a,dsp5b,rps,sv1,ups,bat,sv2,c3k,c4k,sv3,sv4,ip1,ip2,sv5,sv6,slot,msl
ot
        var c1a,c1b,c2a,c2b,c3a,c3b,c4a,c4b,c5a,c5b
        var cb1a,cb1b,cb2a,cb2b,cb3a,cb3b,cb4a,cb4b,cb5a,cb5b
        var str1,str2,str3,str4,str5,str6 function GetVariables(){
        //This function parses the query string and sets the variables
        offset = 0 sw = queryString.substring(offset,queryString.indexOf("&",1))
        offset = queryString.indexOf("&",1) + 1 es = queryString.substring(offset,queryString.indexOf("&",offset))
        start = queryString.indexOf("&",offset) + 1 rspe = queryString.substring(start,queryString.indexOf("&",start))
        offset = queryString.indexOf("&",start) + 1 mrp1 =
queryString.substring(offset,queryString.indexOf("&",offset))
        start = queryString.indexOf("&",offset) + 1 mrp2 = queryString.substring(start,queryString.indexOf("&",start))
        offset = queryString.indexOf("&",start) + 1 mrp3 =
queryString.substring(offset,queryString.indexOf("&",offset))
        start = queryString.indexOf("&",offset) + 1 mrp4 =
queryString.substring(start,queryString.indexOf("&",start))
        offset = queryString.indexOf("&",start) + 1 mrp5 =
queryString.substring(offset,queryString.indexOf("&",offset))
        start = queryString.indexOf("&",offset) + 1
```

```
        mrp1a =
queryString.substring(start,queryString.indexOf("&",start))
        offset = queryString.indexOf("&",start) + 1 mrp1b =
queryString.substring(offset,queryString.indexOf("&",offset))
        start = queryString.indexOf("&",offset) + 1 mrp2a =
queryString.substring(start,queryString.indexOf("&",start))
        offset = queryString.indexOf("&",start) + 1 mrp2b =
queryString.substring(offset,queryString.indexOf("&",offset))
        start = queryString.indexOf("&",offset) + 1 mrp3a =
queryString.substring(start,queryString.indexOf("&",start))
        offset = queryString.indexOf("&",start) + 1 mrp3b =
queryString.substring(offset,queryString.indexOf("&",offset))
        start = queryString.indexOf("&",offset) + 1 mrp4a =
queryString.substring(start,queryString.indexOf("&",start))
        offset = queryString.indexOf("&",start) + 1 mrp4b =
queryString.substring(offset,queryString.indexOf("&",offset))
        start = queryString.indexOf("&",offset) + 1 mrp5a =
queryString.substring(start,queryString.indexOf("&",start))
        offset = queryString.indexOf("&",start) + 1 mrp5b =
queryString.substring(offset,queryString.indexOf("&",offset))
        start = queryString.indexOf("&",offset) + 1 dsp1a =
queryString.substring(start,queryString.indexOf("&",start))
        offset = queryString.indexOf("&",start) + 1 dsp1b =
queryString.substring(offset,queryString.indexOf("&",offset))
        start = queryString.indexOf("&",offset) + 1 dsp2a =
queryString.substring(start,queryString.indexOf("&",start))
        offset = queryString.indexOf("&",start) + 1 dsp2b =
queryString.substring(offset,queryString.indexOf("&",offset))
        start = queryString.indexOf("&",offset) + 1
```

```
        dsp3a =
queryString.substring(start,queryString.indexOf("&",start))
        offset = queryString.indexOf("&",start) + 1 dsp3b =
queryString.substring(offset,queryString.indexOf("&",offset))
        start = queryString.indexOf("&",offset) + 1 dsp4a =
queryString.substring(start,queryString.indexOf("&",start))
        offset = queryString.indexOf("&",start) + 1 dsp4b =
queryString.substring(offset,queryString.indexOf("&",offset))
        start = queryString.indexOf("&",offset) + 1 dsp5a =
queryString.substring(start,queryString.indexOf("&",start))
        offset = queryString.indexOf("&",start) + 1 dsp5b =
queryString.substring(offset,queryString.indexOf("&",offset))
        start = queryString.indexOf("&",offset) + 1 rps = queryString.substring(start,queryString.indexOf("&",start))
        offset = queryString.indexOf("&",start) + 1 sv1 =
queryString.substring(offset,queryString.indexOf("&",offset))
        start = queryString.indexOf("&",offset) + 1 ups = queryString.substring(start,queryString.indexOf("&",start))
        offset = queryString.indexOf("&",start) + 1 bat =
queryString.substring(offset,queryString.indexOf("&",offset))
        start = queryString.indexOf("&",offset) + 1 sv2 = queryString.substring(start,queryString.indexOf("&",start))
        offset = queryString.indexOf("&",start) + 1 c3k =
queryString.substring(offset,queryString.indexOf("&",offset))
        start = queryString.indexOf("&",offset) + 1 c4k = queryString.substring(start,queryString.indexOf("&",start))
        offset = queryString.indexOf("&",start) + 1 sv3 =
queryString.substring(offset,queryString.indexOf("&",offset))
        start = queryString.indexOf("&",offset) + 1 sv4 = queryString.substring(start,queryString.indexOf("&",start))
        offset = queryString.indexOf("&",start) + 1
```

```
        ip1 =
queryString.substring(offset,queryString.indexOf("&",offset))
        start = queryString.indexOf("&",offset) + 1 ip2 = queryString.substring(start,queryString.indexOf("&",start))
        offset = queryString.indexOf("&",start) + 1 sv5 =
queryString.substring(offset,queryString.indexOf("&",offset))
        start = queryString.indexOf("&",offset) + 1 sv6 = queryString.substring(start,queryString.indexOf("&",start))
        offset = queryString.indexOf("&",start) + 1 slot =
queryString.substring(offset,queryString.indexOf("&",offset))
        start = queryString.indexOf("&",offset) + 1 mslot =
queryString.substring(start,queryString.indexOf("&",start))
        offset = queryString.indexOf("&",start) + 1 c1a =
queryString.substring(offset,queryString.indexOf("&",offset))
        start = queryString.indexOf("&",offset) + 1 c1b = queryString.substring(start,queryString.indexOf("&",start))
        offset = queryString.indexOf("&",start) + 1 c2a =
queryString.substring(offset,queryString.indexOf("&",offset))
        start = queryString.indexOf("&",offset) + 1 c2b = queryString.substring(start,queryString.indexOf("&",start))
        offset = queryString.indexOf("&",start) + 1 c3a =
queryString.substring(offset,queryString.indexOf("&",offset))
        start = queryString.indexOf("&",offset) + 1 c3b = queryString.substring(start,queryString.indexOf("&",start))
        offset = queryString.indexOf("&",start) + 1 c4a =
queryString.substring(offset,queryString.indexOf("&",offset))
        start = queryString.indexOf("&",offset) + 1 c4b = queryString.substring(start,queryString.indexOf("&",start))
        offset = queryString.indexOf("&",start) + 1 c5a =
queryString.substring(offset,queryString.indexOf("&",offset))
        start = queryString.indexOf("&",offset) + 1
```

```
        c5b = queryString.substring(start,queryString.indexOf("&",start))
        offset = queryString.indexOf("&",start) + 1 cb1a =
queryString.substring(offset,queryString.indexOf("&",offset))
        start = queryString.indexOf("&",offset) + 1 cb1b = queryString.substring(start,queryString.indexOf("&",start))
        offset = queryString.indexOf("&",start) + 1 cb2a =
queryString.substring(offset,queryString.indexOf("&",offset))
        start = queryString.indexOf("&",offset) + 1 cb2b = queryString.substring(start,queryString.indexOf("&",start))
        offset = queryString.indexOf("&",start) + 1 cb3a =
queryString.substring(offset,queryString.indexOf("&",offset))
        start = queryString.indexOf("&",offset) + 1 cb3b = queryString.substring(start,queryString.indexOf("&",start))
        offset = queryString.indexOf("&",start) + 1 cb4a =
queryString.substring(offset,queryString.indexOf("&",offset))
        start = queryString.indexOf("&",offset) + 1 cb4b = queryString.substring(start,queryString.indexOf("&",start))
        offset = queryString.indexOf("&",start) + 1 cb5a =
queryString.substring(offset,queryString.indexOf("&",offset))
        start = queryString.indexOf("&",offset) + 1 cb5b = queryString.substring(start,queryString.length)

}//END Function GetVariables

<!--//  Engage Cloaking Device function sendQueryString(handlerURL){ str1 = sw + "&" + es + "&" + rspe + "&" + mrp1 + "&" + mrp2 + "&" + mrp3
+ "&" + mrp4 + "&" + mrp5 + "&" + mrp1a + "&" + mrp1b + "&" + mrp2a
str2 = "&" + mrp2b + "&" + mrp3a + "&" + mrp3b + "&" + mrp4a + "&" +
mrp4b + "&" + mrp5a + "&" + mrp5b + "&" + dsp1a + "&" + dsp1b + "&" +
dsp2a
```

```
str3 = "&" + dsp2b + "&" + dsp3a + "&" + dsp3b + "&" + dsp4a + "&" +
dsp4b + "&" + dsp5a + "&" + dsp5b + "&" + rps + "&" + sv1 + "&" + ups +
"&" + bat
str4 = "&" + sv2 + "&" + c3k + "&" + c4k + "&" + sv3 + "&" + sv4 + "&" +
ip1 + "&" + ip2 + "&" + sv5 + "&" + sv6 + "&" + slot + "&" + mslot
str5 = "&" + c1a + "&" + c1b + "&" + c2a + "&" + c2b + "&" + c3a + "&" +
c3b+ "&" + c4a+ "&" + c4b+ "&" + c5a + "&" + c5b
str6 = "&" + cb1a + "&" + cb1b + "&" + cb2a + "&" + cb2b + "&" + cb3a +
"&" + cb3b+ "&" + cb4a+ "&" + cb4b+ "&" + cb5a + "&" + cb5b
       urlBind = handlerURL + "?" + str1 + str2 + str3 + str4 + str5 +
str6;
       document.location.href = urlBind;

} function GetQueryString(mrpnum){ slot = mrpnum
str1 = sw + "&" + es + "&" + rspe + "&" + mrp1 + "&" + mrp2 + "&" + mrp3
+ "&" + mrp4 + "&" + mrp5 + "&" + mrp1a + "&" + mrp1b + "&" + mrp2a
str2 = "&" + mrp2b + "&" + mrp3a + "&" + mrp3b + "&" + mrp4a + "&" +
mrp4b + "&" + mrp5a + "&" + mrp5b + "&" + dsp1a + "&" + dsp1b + "&" +
dsp2a
str3 = "&" + dsp2b + "&" + dsp3a + "&" + dsp3b + "&" + dsp4a + "&" +
dsp4b + "&" + dsp5a + "&" + dsp5b + "&" + rps + "&" + sv1 + "&" + ups +
"&" + bat
str4 = "&" + sv2 + "&" + c3k + "&" + c4k + "&" + sv3 + "&" + sv4 + "&" +
ip1 + "&" + ip2 + "&" + sv5 + "&" + sv6 + "&" + slot + "&" + mslot
str5 = "&" + c1a + "&" + c1b + "&" + c2a + "&" + c2b + "&" + c3a + "&" +
c3b+ "&" + c4a+ "&" + c4b+ "&" + c5a + "&" + c5b
str6 = "&" + cb1a + "&" + cb1b + "&" + cb2a + "&" + cb2b + "&" + cb3a +
"&" + cb3b+ "&" + cb4a+ "&" + cb4b+ "&" + cb5a + "&" + cb5b qs = "?" + str1 + str2 + str3 + str4 + str5 + str6;
       return qs;

} function buildPartList(){ str1 = sw + "&" + es + "&" + rspe + "&" + mrp1 + "&" + mrp2 + "&" + mrp3
+ "&" + mrp4 + "&" + mrp5 + "&" + mrp1a + "&" + mrp1b + "&" + mrp2a
str2 = "&" + mrp2b + "&" + mrp3a + "&" + mrp3b + "&" + mrp4a + "&" +
mrp4b + "&" + mrp5a + "&" + mrp5b + "&" + dsp1a + "&" + dsp1b + "&" +
dsp2a
str3 = "&" + dsp2b + "&" + dsp3a + "&" + dsp3b + "&" + dsp4a + "&" +
dsp4b + "&" + dsp5a + "&" + dsp5b + "&" + rps + "&" + sv1 + "&" + ups +
"&" + bat
str4 = "&" + sv2 + "&" + c3k + "&" + c4k + "&" + sv3 + "&" + sv4 + "&" +
ip1 + "&" + ip2 + "&" + sv5 + "&" + sv6 + "&" + slot + "&" + mslot
str5 = "&" + c1a + "&" + c1b + "&" + c2a + "&" + c2b + "&" + c3a + "&" +
c3b+ "&" + c4a+ "&" + c4b+ "&" + c5a + "&" + c5b
```

CIS00-3681

```
    str6 = "&" + cb1a + "&" + cb1b + "&" + cb2a + "&" + cb2b + "&" + cb3a +
    "&" + cb3b+ "&" + cb4a+ "&" + cb4b+ "&" + cb5a + "&" + cb5b
        urlBind = "part_list.html?" + str1 + str2 + str3 + str4 + str5 +
    str6;
        top.rightFrame.document.location.href = urlBind;

}

//   Disengage Cloaking Device   -->
```

"STEP2.HTML":

```
   <!DOCTYPE HTML PUBLIC "-//W3C//DTD HTML 3.2 Final//EN">
   <html xmlns:v="urn:schemas-microsoft-com:vml"
 5 xmlns:o="urn:schemas-microsoft-com:office:office"
   xmlns:w="urn:schemas-microsoft-com:office:word"
   xmlns="http://www.w3.org/TR/REC-html40">

<head>
10 <meta http-equiv=Content-Type content="text/html;
   charset=windows-1252">
   <meta name=ProgId content=Word.Document>
   <meta name=Generator content="Microsoft Word 9">
   <meta name=Originator content="Microsoft Word 9">
15 <link rel=File-List href="./step2_files/filelist.xml">
   <link rel=Edit-Time-Data href="./step2_files/editdata.mso">
   <!--[if !mso]>
   <style>
   v\:* {behavior:url(#default#VML);}
20 o\:* {behavior:url(#default#VML);}
   w\:* {behavior:url(#default#VML);}
   .shape {behavior:url(#default#VML);}
   </style>
   <![endif]-->
25 <title>Cisco ICS-7750 Configuration Tool</title>
   <!--[if gte mso 9]><xml>
    <o:DocumentProperties>
     <o:Author>Barry Chapin</o:Author>
     <o:Revision>1</o:Revision>
30   <o:TotalTime>0</o:TotalTime>
     <o:Created>2000-12-01T18:16:00Z</o:Created>
     <o:Pages>1</o:Pages>
     <o:Words>146</o:Words>
     <o:Characters>835</o:Characters>
35   <o:Company>Chapin & Huang, L.L.C.</o:Company>
     <o:Lines>6</o:Lines>
     <o:Paragraphs>1</o:Paragraphs>
     <o:CharactersWithSpaces>1025</o:CharactersWithSpaces>
     <o:Version>9.2720</o:Version>
40  </o:DocumentProperties>
   </xml><![endif]--><!--[if gte mso 9]><xml>
    <w:WordDocument>
     <w:Zoom>0</w:Zoom>
    </w:WordDocument>
45 </xml><![endif]-->
   <style>
```

```
     <!--
     /* Style Definitions */
     p.MsoNormal, li.MsoNormal, div.MsoNormal
          {mso-style-parent:"";
  5       margin:0in;
          margin-bottom:.0001pt;
          mso-pagination:widow-orphan;
          font-size:12.0pt;
          font-family:"Times New Roman";
 10       mso-fareast-font-family:"Times New Roman";}
     @page Section1
          {size:8.5in 11.0in;
          margin:1.0in 1.25in 1.0in 1.25in;
          mso-header-margin:.5in;
 15       mso-footer-margin:.5in;
          mso-paper-source:0;}
     div.Section1
          {page:Section1;}
     -->
 20  </style>

<script language="JavaScript"  src="ics7750.js">

//////////////////////////////////////////////////////////
 25  ///
     // Loads the querystring parsing and passing functions
     // used to pass variables and maintain state.
     //////////////////////////////////////////////////////////
     ///
 30  </script>

<script language="JavaScript">

<!-- Engage Cloaking Device
 35
     //////////////////////////////////////////////////////////
     ///
     // Call GetVariables() to load variable from the querysting
     //////////////////////////////////////////////////////////
 40  ///

GetVariables()

//////////////////////////////////////////////////////////
 45  ///
     // popWindow() opens a pop-up window for help/definitions
```

```
////////////////////////////////////////////////////////////
/// function popWindow(link_url)
{
    // Creates the pop-up window for definitions and help items ContentWindow=window.open(link_url,"ContentWindow","toolbar=no,location=no,scrollbars=yes,width=236,height=300,screenX=25,screenY=25");
}

////////////////////////////////////////////////////////////
///
// pageLoad() sets the appropriate graphic in the left frame
// for the current step and calls buildPartList() to reload the
// right frame parts list.
////////////////////////////////////////////////////////////
/// function pageLoad()
{
    // Sets status graphic in left-hand frame and call buildPartList()
    // to reload the right-hand frame part list document top.leftFrame.document.leftbar.src='images/leftbar_2.gif'
    buildPartList()
}

////////////////////////////////////////////////////////////
///
// updateVariables() sets variables to the user-selected values
// and sends the querystring to the next page of the questionaire.
////////////////////////////////////////////////////////////
///
```

```
function updateVariables(loadPage)
{
        // Sets the sw varible to the value specified by the
form
        if(document.swForm.sw[0].checked)  {sw = "S77a-1.x.x"}
        if(document.swForm.sw[1].checked)  {sw = "S77b-1.x.x"}
        if(document.swForm.sw[2].checked)  {sw = "S77c-1.x.x"}
        if(document.swForm.sw[3].checked)  {sw = "S77d-1.x.x"}
        if(document.swForm.sw[4].checked)  {sw = "S77e-1.x.x"}
        if(document.swForm.sw[5].checked)  {sw = "S77f-1.x.x"}
        sendQueryString(loadPage)
}

//--> Disengage Cloaking Device
</script>
<!--[if gte mso 9]><xml>
 <o:shapedefaults v:ext="edit" spidmax="2050"/>
</xml><![endif]--><!--[if gte mso 9]><xml>
 <o:shapelayout v:ext="edit">
  <o:idmap v:ext="edit" data="1"/>
 </o:shapelayout></xml><![endif]-->
</head>

<body bgcolor=white lang=EN-US link=blue vlink=blue
style='tab-interval:.5in'
marginheight=0 marginwidth=0 leftmargin=0 topmargin=0
onload="pageLoad()">

<div class=Section1>

<form name=swForm>

<p class=MsoNormal><img width=348 height=24
id="_x0000_i1025"
src="file:///D:/CH%20Client%20Files/CIS%20-
%20Cisco%20Systems/CIS00-3681/CIS00-3681-
Disclosure/Cisco%207750/images/step_two.gif"
border=0></p>

<table border=0 cellpadding=0 width="100%"
style='width:100.0%;mso-cellspacing:
 1.5pt'>
 <tr>
  <td style='padding:.75pt .75pt .75pt .75pt'>
```

```
        <p class=MsoNormal><b><span style='font-
    size:13.5pt'>Select an ICS-7750
          software feature set.</span></b><br>
          <span style='font-size:10.0pt'>The ICS-7750 comes
 5      standard with a base
          software set [S77a-1.x.x]. This software resides on the
    <a
          href="javascript:popWindow('def_spe.html')">SPE200</a>
    card and includes the
10        operating system for the SPE200, <a
          href="javascript:popWindow('def_callmanager.html')">Call
    Manager 3.0</a>,
          ICS7750 System Manager and Cisco IOS - IP/VOICE PLUS.
    <br>
15        <br>
          <script language="JavaScript">

<!-- Engage Cloaking Device

20  // Display the software options displaying the current sw
    value as checked document.writeln('<table>')
    document.writeln('<tr>')
25  document.writeln('   <td valign=top colspan=2><font size="-
    1"><b>Standard Software:</b></font></td>')
    document.writeln('</tr>')
    document.writeln('<tr>')
    document.write('     <td valign=top><input type="Radio"
30  name="sw" value="S77a-1.x.x" ')

if(sw=='S77a-1.x.x') {document.write('checked')} document.write('></td>')
35  document.writeln('   <td valign=top><font size="-1">Call
    Manager 3.0, ICS System Manager 1.0 & IOS - IP/VOICE PLUS
    <nobr><b>[S77a-1.x.x]</b></nobr></font></td>')
    document.writeln('</tr>')
    document.writeln('<tr>')
40  document.writeln('   <td valign=top colspan=2><font size="-
    1"><br><b>Optional Upgrades:</b></font></td>')
    document.writeln('</tr>')
    document.writeln('<tr>')
    document.write('     <td valign=top><input type="Radio"
45  name="sw" value="S77b-1.x.x" ')
```

```
if(sw=='S77b-1.x.x') {document.write('checked')} document.write('></td>')
document.writeln('  <td valign=top><font size="-1">Call
Manager 3.0, ICS System Manager 1.0 & IOS - IP/FW/VOICE
PLUS IPSec 56 <nobr><b>[S77b-
1.x.x]</b></nobr></font></td>')
document.writeln('</tr>')
document.writeln('<tr>')
document.write('     <td valign=top><input type="Radio"
name="sw" value="S77c-1.x.x" ')

if(sw=='S77c-1.x.x') {document.write('checked')} document.write('></td>')
document.writeln('  <td valign=top><font size="-1">Call
Manager 3.0, ICS System Manager 1.0 & IOS -IP/FW/VOICE PLUS
IPSec 3DES <nobr><b>[S77c-1.x.x]</b></nobr></font></td>')
document.writeln('</tr>')
document.writeln('<tr>')
document.write('     <td valign=top><input type="Radio"
name="sw" value="S77d-1.x.x" ')

if(sw=='S77d-1.x.x') {document.write('checked')} document.write('></td>')
document.writeln('  <td valign=top><font size="-1">Call
Manager 3.0, ICS System Manager 1.0 & IOS -
IP/IPX/AT/IBM/VOICE PLUS <nobr><b>[S77d-
1.x.x]</b></nobr></font></td>')
document.writeln('</tr>')
document.writeln('<tr>')
document.write('     <td valign=top><input type="Radio"
name="sw" value="S77e-1.x.x" ')

if(sw=='S77e-1.x.x') {document.write('checked')} document.write('></td>')
document.writeln('  <td valign=top><font size="-1">Call
Manager 3.0, ICS System Manager 1.0 & IOS -
IP/IPX/AT/IBM/FW/Voice Plus IPSec 56 <nobr><b>[S77e-
1.x.x]</b></nobr></font></td>')
document.writeln('</tr>')
document.writeln('<tr>')
document.write('     <td valign=top><input type="Radio"
name="sw" value="S77f-1.x.x" ')
```

```
    if(sw=='S77f-1.x.x') {document.write('checked')} document.write('></td>')
5   document.writeln('  <td valign=top><font size="-1">Call
    Manager 3.0, ICS System Manager 1.0 & IOS -
    IP/IPX/AT/IBM/FW/VOICE PLUS IPSec 3DES <nobr><b>[S77f-
    1.x.x]</b></nobr></font></td>')
    document.writeln('</tr>')
10  document.writeln('</table>')

// Disengage Cloaking Device -->
      </script></span></p>
      </td>
15    </tr>
      <tr>
      <td style='padding:.75pt .75pt .75pt .75pt'>
      <p class=MsoNormal align=right style='text-
    align:right'><a
20    href="javascript:updateVariables('step1a.html')"><span
    style='text-decoration:
      none;text-underline:none'><img border=0 width=57
    height=26 id="_x0000_i1027"
      src="file:///D:/CH%20Client%20Files/CIS%20-
25    %20Cisco%20Systems/CIS00-3681/CIS00-3681-
    Disclosure/Cisco%207750/images/button_back.gif"></span></a>
     <a
      href="javascript:updateVariables('step3.html')"><span
    style='text-decoration:
30    none;text-underline:none'><img border=0 width=57
    height=26 id="_x0000_i1028"
      src="file:///D:/CH%20Client%20Files/CIS%20-
    %20Cisco%20Systems/CIS00-3681/CIS00-3681-
    Disclosure/Cisco%207750/images/button_next.gif"></span></a>
35        </p>
      </td>
      </tr>
    </table>

40  </form>

</div>

</body>
45
    </html>
```

"STEP3.HTML":

```
<!DOCTYPE HTML PUBLIC "-//W3C//DTD HTML 3.2 Final//EN">
<html xmlns:v="urn:schemas-microsoft-com:vml"
 xmlns:o="urn:schemas-microsoft-com:office:office"
 xmlns:w="urn:schemas-microsoft-com:office:word"
 xmlns="http://www.w3.org/TR/REC-html40">

<head>
<meta http-equiv=Content-Type content="text/html; charset=windows-1252">
<meta name=ProgId content=Word.Document>
<meta name=Generator content="Microsoft Word 9">
<meta name=Originator content="Microsoft Word 9">
<link rel=File-List href="./step3_files/filelist.xml">
<link rel=Edit-Time-Data href="./step3_files/editdata.mso">
<!--[if !mso]>
<style>
v\:* {behavior:url(#default#VML);}
o\:* {behavior:url(#default#VML);}
w\:* {behavior:url(#default#VML);}
.shape {behavior:url(#default#VML);}
</style>
<![endif]-->
<title>Cisco ICS-7750 Configuration Tool</title>
<!--[if gte mso 9]><xml>
 <o:DocumentProperties>
  <o:Author>Barry Chapin</o:Author>
  <o:Revision>1</o:Revision>
  <o:TotalTime>0</o:TotalTime>
  <o:Created>2000-12-01T18:20:00Z</o:Created>
  <o:Pages>1</o:Pages>
  <o:Words>186</o:Words>
  <o:Characters>1065</o:Characters>
  <o:Company>Chapin & Huang, L.L.C.</o:Company>
  <o:Lines>8</o:Lines>
  <o:Paragraphs>2</o:Paragraphs>
  <o:CharactersWithSpaces>1307</o:CharactersWithSpaces>
  <o:Version>9.2720</o:Version>
 </o:DocumentProperties>
</xml><![endif]--><!--[if gte mso 9]><xml>
 <w:WordDocument>
  <w:Zoom>0</w:Zoom>
 </w:WordDocument>
</xml><![endif]-->
<style>
```

```
<!--
/* Style Definitions */
p.MsoNormal, li.MsoNormal, div.MsoNormal
     {mso-style-parent:"";
     margin:0in;
     margin-bottom:.0001pt;
     mso-pagination:widow-orphan;
     font-size:12.0pt;
     font-family:"Times New Roman";
     mso-fareast-font-family:"Times New Roman";}
@page Section1
     {size:8.5in 11.0in;
     margin:1.0in 1.25in 1.0in 1.25in;
     mso-header-margin:.5in;
     mso-footer-margin:.5in;
     mso-paper-source:0;}
div.Section1
     {page:Section1;}
-->
</style>

<script language="JavaScript"  src="ics7750.js">

////////////////////////////////////////////////////////
///
// Loads the querystring parsing and passing functions
// used to pass variables and maintain state.
////////////////////////////////////////////////////////
///
</script>

<script language="JavaScript">

<!-- Engage Cloaking Device

////////////////////////////////////////////////////////
///
// Call GetVariables() to load variable from the querysting
////////////////////////////////////////////////////////
///

GetVariables()

////////////////////////////////////////////////////////
///
// popWindow() opens a pop-up window for help/definitions
```

```
////////////////////////////////////////////////////////
///
function popWindow(link_url)
{
        ContentWindow=window.open(link_url,"ContentWindow","toolbar=no,location=no,scrollbars=yes,width=236,height=300,screenX=25,screenY=25");
}
////////////////////////////////////////////////////////
///
// pageLoad() sets the appropriate graphic in the left
frame
// for the current step and calls buildPartList() to reload
the
// right frame parts list.
////////////////////////////////////////////////////////
/// function pageLoad()
{
        // Sets status graphic in left-hand frame and call buildPartList()
        // to reload the right-hand frame part list document top.leftFrame.document.leftbar.src='images/leftbar_3.gif'
        buildPartList()
}

////////////////////////////////////////////////////////
///
// updateVariables() sets variables to the user-selected values
// and sends the querystring to the next page of the questionaire.
////////////////////////////////////////////////////////
/// function updateVariables(loadPage)
{
        // Sets the sw varible to the value specified by the form
```

```
                if(document.rspeform.rspe[0].checked) { if((mrp1=='y')&&(mrp2=='y')&&(mrp3=='y')&&(mrp4=='y')&
     &(mrp5=='y')){
                        alert("All available slots are full.  You
     must remove one or more MRP cards to add the redundant
     SPE.")
          }
                        else {rspe = "y"}
                                                             }
                if(document.rspeform.rspe[1].checked) {rspe = "n"} sendQueryString(loadPage)
     }
     //--> Disengage Cloaking Device
     </script>
     <!--[if gte mso 9]><xml>
      <o:shapedefaults v:ext="edit" spidmax="2050"/>
     </xml><![endif]--><!--[if gte mso 9]><xml>
      <o:shapelayout v:ext="edit">
       <o:idmap v:ext="edit" data="1"/>
      </o:shapelayout></xml><![endif]-->
     </head>

<body bgcolor=white lang=EN-US link=blue vlink=blue
     style='tab-interval:.5in'
     marginheight=0 marginwidth=0 leftmargin=0 topmargin=0
     onload="pageLoad()">

<div class=Section1>

<form name=rspeform>

<p class=MsoNormal><img width=348 height=24
     id="_x0000_i1025"
     src="file:///D:/CH%20Client%20Files/CIS%20-
     %20Cisco%20Systems/CIS00-3681/CIS00-3681-
     Disclosure/Cisco%207750/images/step_three.gif"
     border=0></p>

<table border=0 cellpadding=0 width="100%"
     style='width:100.0%;mso-cellspacing:
     1.5pt'>
     <tr>
```

```
        <td style='padding:.75pt .75pt .75pt .75pt'>
        <p class=MsoNormal><b><span style='font-
        size:13.5pt'>Choose Redundant System
        Processing Engine (SPE).</span></b><br>
 5      <span style='font-size:10.0pt'>The <a
        href="javascript:popWindow('def_spe.html')">SPE</a> is a
        single-board
        computer that can run Cisco <a 10      href="javascript:popWindow('def_callmanager.html')">CallMan
        ager</a> and core
        voice applications such as voice mail and auto-attendant,
        as well as
        interactive voice response (IVR), unified messaging,
15      automated call
        distributor (ACD), and Web-based contact center
        applications. <br>
        <br>
        The advantages of adding a redundant SPE are increased
20      reliability,
        fault-tolerance, and instant fail-over. The disadvantage
        is that it takes up
        one of the remaining five chassis slots.<br>
        <br>
25      </span><b>Would you like to add a redundant SPE?</b><br>
        <script language="JavaScript">

// Display the redundant SPE options displaying the current
        rspe value as checked
30
        document.writeln("<table>")
        document.writeln("<tr>")
        document.writeln("<td valign=top><input type='Radio'
        name='rspe' ")
35      if(rspe=='y') {document.write('checked')}
        document.writeln("></td>")

document.writeln("<td valign=top><font size='-
        1'>Yes</font></td>")
40      document.writeln("</tr>")
        document.writeln("<tr>")
            document.writeln("<td valign=top><input type='Radio'
        name='rspe' ")
        if(rspe=='n') {document.write('checked')}
45      document.writeln("></td>")
```

```
        document.writeln("<td valign=top><font size='-
1'>No</font></td>")
document.writeln("</tr>")

document.writeln("</table>")
  </script></p>
  </td>
 </tr>
 <tr>
  <td style='padding:.75pt .75pt .75pt .75pt'>
  <p class=MsoNormal align=right style='text-
align:right'><a
  href="javascript:updateVariables('step2.html')"><span
style='text-decoration:
  none;text-underline:none'><img border=0 width=57
height=26 id="_x0000_i1027"
   src="file:///D:/CH%20Client%20Files/CIS%20-
%20Cisco%20Systems/CIS00-3681/CIS00-3681-
Disclosure/Cisco%207750/images/button_back.gif"></span></a>
 <a
  href="javascript:updateVariables('step4.html')"><span
style='text-decoration:
  none;text-underline:none'><img border=0 width=57
height=26 id="_x0000_i1028"
   src="file:///D:/CH%20Client%20Files/CIS%20-
%20Cisco%20Systems/CIS00-3681/CIS00-3681-
Disclosure/Cisco%207750/images/button_next.gif"></span></a>
      </p>
  </td>
 </tr>
</table>

</form>

</div>

</body>

</html>
```

END OF APPENDIX A

What is claimed is:

1. In a browser, a method for transferring information between logic entities in browser pages, the method comprising the steps of:
    defining a data element having a value for use by a first application logic entity in a first browser page;
    generating a browser page identifier for a second browser page, the browser page identifier including the value for the data element;
    invoking access to a second browser page using the browser page identifier, the second browser page including a second application logic entity; and
    retrieving the value of the data element from the browser page identifier for use by the second application logic entity;
    wherein the step of generating a browser page identifier includes steps of:
        i) extracting a value for each data element shared between the first application logic entity and the second application logic entity to create a value array;
        ii) obtaining a page designator for the second browser page; and
        iii) appending the value array containing the values for each data element to the page designator for the second browser page to form the browser page identifier; and
    wherein the browser page identifier is a uniform resource locator that is dynamically generated via the steps of extracting, obtaining and appending and that contains the value of the data element shared by the first application logic entity and the second application logic entity.

2. The method of claim 1 wherein the step of defining a data element includes the steps of:
    declaring a data element for use by a first application logic entity; and
    providing a value for the data element.

3. The method of claim 2, wherein the step of providing a value for the data element comprises the step of:
    retrieving the value for the data element from a browser page identifier identifying the first browser page.

4. The method of claim 3 wherein the step of retrieving a value of the data element from a browser page identifier identifying the first browser page includes the steps of:
    parsing the browser page identifier to retrieve a value for a data element from the browser page identifier;
    assigning the value to the data element that corresponds to the value parsed from the browser page identifier; and
    repeating the steps of parsing and assigning for each value contained in the browser page identifier such that all data elements containing a value within the browser page identifier receive an assignment of their respective value parsed from the browser page identifier.

5. The method of claim 1 further including the step of:
    detecting a navigation command to navigate to the second browser page; and
    wherein the steps of generating and invoking are performed in response to the step of detecting the navigation command to navigate to the second browser page, such that the browser page identifier produced in response to the step of detecting the navigation command includes a value for the data element that is created by the first application logic entity and is passed to the second application logic entity via the browser page identifier.

6. The method of claim 1 wherein:
    the steps of generating and invoking are performed by a state sender logic entity; and
    wherein the step of retrieving is performed by a state retrieval logic entity;
    the state sender logic entity and state retrieval logic entity being logic entities incorporated into the first browser page and second browser page which interoperate to transfer values of data elements shared by the first application logic entity and the second application logic entity between the first browser page and the second browser page via incorporation of such values of data elements into browser page identifiers.

7. The method of claim 6 wherein:
    the first application logic entity and the second application logic entity collectively form an application; and
    wherein the values of data elements shared by the first application logic entity and the second application logic entity collectively form state information that the state sender logic entity and the state retrieval logic entity can pass between the first browser page and second browser page via browser page identifiers for use by the application.

8. A computer system comprising:
    a processor;
    a memory system; and
    an interconnection mechanism coupling the processor and the memory system;
    wherein the memory system is encoded with a browser application that, when performed on the processor, provides a browser that causes the computer system to transfer information between logic entities in browser pages by performing the operations of:
    defining a data element having a value for use by a first application logic entity in a first browser page in the memory system;
    generating a browser page identifier for a second browser page in the memory system, the browser page identifier including the value for the data element;
    invoking access to a second browser page using the browser page identifier, the second browser page including a second application logic entity in the memory system; and
    retrieving the value of the data element from the browser page identifier for use by the second application logic entity in the memory system;
    wherein when the browser performs the operation of generating a browser page identifier, the browser performs the operations of:
        i) extracting a value for each data element shared between the first application logic entity and the second application logic entity to create a value array;
        ii) obtaining a page designator for the second browser page; and
        iii) appending the value array containing the values for each data element to the page designator for the second browser page to form the browser page identifier; and
    wherein the browser page identifier is a uniform resource locator that is dynamically generated by the browser via the operations of extracting, obtaining and appending and that contains the value of the data element shared by the first application logic entity and the second application logic entity.

9. The computer system of claim 8 wherein when the browser performs the operation of defining a data element, the browser performs the operations of:
  declaring, in the memory system, a data element for use by a first application logic entity in the first browser page; and
  providing a value for the data element in the memory system.

10. The computer system of claim 9, wherein when the browser performs the operation of providing a value for the data element, the browser performs the operation of:
  retrieving the value for the data element from a browser page identifier identifying the first browser page.

11. The computer system of claim 10, wherein when the browser performs the operation of retrieving a value of the data element from a browser page identifier identifying the first browser page, the browser performs the operations of:
  parsing the browser page identifier to retrieve a value for a data element from the browser page identifier in the memory system;
  assigning the value to the data element that corresponds to the value parsed from the browser page identifier in the memory system; and
  repeating the operations of parsing and assigning for each value contained in the browser page identifier such that all data elements containing a value within the browser page identifier receive an assignment of their respective value parsed from the browser page identifier.

12. The computer system of claim 8 wherein the browser further causes the computer system to perform the operations of:
  detecting a navigation command to navigate to the second browser page; and
  wherein the operations of generating and invoking are performed in response to the operation of detecting the navigation command to navigate to the second browser page, such that the browser page identifier produced in response to the operation of detecting the navigation command includes a value for the data element that is created by the first application logic entity and is passed to the second application logic entity via the browser page identifier.

13. The computer system of claim 8 wherein:
  the operations of generating and invoking are performed by a state sender logic entity that operates within the browser as the browser operates on the processor; and
  wherein the operation of retrieving is performed by a state retrieval logic entity;
  the state sender logic entity and state retrieval logic entity being logic entities incorporated into the first browser page and second browser page which interoperate to transfer values of data elements shared by the first application logic entity and the second application logic entity between the first browser page and the second browser page via incorporation of such values of data elements into browser page identifiers.

14. The computer system of claim 13 wherein:
  the first application logic entity and the second application logic entity collectively form an application distributed across multiple browser pages; and
  wherein the values of data elements shared by the first application logic entity and the second application logic entity collectively form state information that the state sender logic entity and the state retrieval logic entity, when performed within the browser, can pass between the first browser page and second browser page via browser page identifiers for use by the application.

15. A computer program product having a computer-readable medium including computer program logic encoded thereon for transferring information between logic entities in browser pages, such that the computer program logic, when performed on at least one processor within a computer system, causes the at least one processor to perform the operations of:
  defining a data element having a value for use by a first application logic entity in a first browser page;
  generating a browser page identifier for a second browser page, the browser page identifier including the value for the data element;
  invoking access to a second browser page using the browser page identifier, the second browser page including a second application logic entity; and
  retrieving the value of the data element from the browser page identifier for use by the second application logic entity;
  wherein the step of generating a browser page identifier includes steps of:
    i) extracting a value for each data element shared between the first application logic entity and the second application logic entity to create a value array;
    ii) obtaining a page designator for the second browser page; and
    iii) appending the value array containing the values for each data element to the page designator for the second browser page to form the browser page identifier; and
  wherein the browser page identifier is a uniform resource locator that is dynamically generated via the steps of extracting, obtaining and appending and that contains the value of the data element shared by the first application logic entity and the second application logic entity.

16. A computer system comprising:
  a processor;
  a memory system; and
  an interconnection mechanism coupling the input output interface, the processor and the memory system;
  means for defining a data element in the memory system having a value for use by a first application logic entity in a first browser page in the memory system;
  means for generating a browser page identifier in the memory system for a second browser page in the memory system, the browser page identifier including the value for the data element;
  means for invoking access to a second browser page in the memory system using the browser page identifier, the second browser page including a second application logic entity in the memory system; and
  means for retrieving the value of the data element from the browser page identifier for use by the second application logic entity in the memory system;
  wherein the means for generating a browser page identifier includes:
    i) means for extracting a value for each data element shared between the first application logic entity and the second application logic entity to create a value array;
    ii) means for obtaining a page designator for the second browser page; and
    iii) means for appending the value array containing the values for each data element to the page designator for the second browser page to form the browser page identifier; and wherein the browser page identifier is a uniform resource locator that is dynamically generated via the means for extracting, obtaining and appending and that contains the value of the data element shared by the first application logic entity and the second application logic entity.

17. The method of claim 1, wherein generating the browser page identifier includes generating the browser page identifier from within the first browser page in the browser, the method further comprising:
    displaying the browser page identifier in the first browser page displayed to a user; and
    receiving a selection by the user of the browser page identifier to retrieve the second browser page.

18. The method of claim 17 further comprising passing the value of the data element from the first browser page of the browser to the second browser page of the browser by:
    appending the value of the data element associated with the first browser page to the browser page identifier;
    in response to receiving the selection by the user, utilizing the browser page identifier to retrieve the second browser page; and
    utilizing the data value in the second browser page of the browser.

19. The method of claim 1, wherein the steps of defining, generating, invoking, and retrieving support a step of:
    exchanging data from script code associated with the first browser page to the second browser page not currently being viewed by a user of the browser.

20. The method of claim 1, wherein the steps of defining, generating, invoking, and retrieving support a step of:
    maintaining state information between a portion of script code associated with the first browser page of the browser and another portion of script code associated with the second browser page of the browser.

21. A method as in claim 1 further comprising:
    from a state sender logic entity of the first browser page associated with the browser, appending the value of the data element to the browser page identifier; and
    from a state retrieval logic entity of the second browser page associated with the browser, receiving the value of the data element along with the browser page identifier.

22. A method as in claim 21 further comprising:
    from a state sender logic entity of the second browser page associated with the browser, appending the value of the data element to a browser page identifier associated with a third browser page; and
    from a state retrieval logic entity of the third browser page associated with the browser, receiving the value of the data element along with the second browser page identifier.

23. The computer system as in claim 8, wherein generating the browser page identifier includes generating the browser page identifier from within the first browser page in the browser, the method further comprising:
    displaying the first browser page to a user
    displaying, to the user, the browser page identifier in the first browser page displayed to the user; and
    receiving a selection by the user of the browser page identifier in the first browser page to retrieve the second browser page.

24. The computer system as in claim 23 further supporting operations of passing the value of the data element from the first browser page of the browser to the second browser page of the browser by:
    appending the value of the data element associated with the first browser page to the browser page identifier;
    in response to receiving the selection by the user, utilizing the browser page identifier to retrieve the second browser page; and
    utilizing the data value in the second browser page of the browser.

25. The computer system as in claim 8, wherein the steps of defining, generating, invoking, and retrieving support an operation of:
    exchanging data from script code associated with the first browser page to the second browser page not currently being viewed by a user of the browser.

26. The computer system as in claim 8 supporting an operation of:
    maintaining state information between a portion of script code associated with the first browser page of the browser and another portion of script code associated with the second browser page of the browser.

27. A computer system as in claim 8 further supporting:
    from a state sender logic entity of the first browser page associated with the browser, appending the value of the data element to the browser page identifier; and
    from a state retrieval logic entity of the second browser page associated with the browser, receiving the value of the data element along with the browser page identifier.

28. A computer system as in claim 27 further supporting:
    from a state sender logic entity of the second browser page associated with the browser, appending the value of the data element to a browser page identifier associated with a third browser page; and
    from a state retrieval logic entity of the third browser page associated with the browser, receiving the value of the data element along with the second browser page identifier.

29. A computer system as in claim 8 further supporting:
    from a state sender logic entity of the first browser page associated with the browser, appending the value of the data element to the browser page identifier used to retrieve the second browser page; and
    from a state retrieval logic entity of the second browser page associated with the browser, receiving the value of the data element appended to the browser page identifier for the second browser page by parsing the browser page identifier and retrieving the data element.

30. A computer system as in claim 29 further supporting:
    from a state sender logic entity of the second browser page associated with the browser, modifying the value of the data element, appending the modified value of the data element to a browser page identifier used to retrieve a third browser page of the browser;
    invoking access to the third browser page to the browser page identifier associated with the third browser page; and
    from a state retrieval logic entity of the third browser page of the browser, receiving the modified value of the data element appended to the browser page identifier for the third browser page of the browser.

31. A computer as in claim 30, wherein the modified value includes a concatenation of a first string of data associated with the first browser page and a second string of data associated with the second browser page.

32. A computer as in claim 30, wherein the modified value includes an arithmetic result based on use of an arithmetic operation on a first numerical value associated with the first browser page and a second numerical value associated with the second browser page.

33. A computer system as in claim 29, wherein generating the browser page identifier for the second browser page includes providing a delimiter between a first portion and a second portion of the browser page identifier, the first portion of the browser page identifier used by a server to serve the second browser page to the browser, the second portion of the browser page identifier including the value of the data element being passed from the first browser page to the second browser page, the value of the data element being ignored by a server serving the second browser page to the browser.

* * * * *